(12) United States Patent
Hunstable

(10) Patent No.: US 11,218,046 B2
(45) Date of Patent: *Jan. 4, 2022

(54) DC ELECTRIC MOTOR/GENERATOR WITH ENHANCED PERMANENT MAGNET FLUX DENSITIES

(71) Applicant: Linear Labs, LLC, Granbury, TX (US)

(72) Inventor: Fred E. Hunstable, Granbury, TX (US)

(73) Assignee: Linear Labs, Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,360

(22) Filed: Nov. 15, 2017

(65) Prior Publication Data

US 2018/0331593 A1 Nov. 15, 2018

Related U.S. Application Data

(63) Continuation of application No. 14/490,656, filed on Sep. 18, 2014, now Pat. No. 9,825,496, which is a
(Continued)

(51) Int. Cl.
*H02K 3/04* (2006.01)
*H02K 16/02* (2006.01)
(Continued)

(52) U.S. Cl.
CPC .............. *H02K 3/04* (2013.01); *H02K 1/17* (2013.01); *H02K 1/2766* (2013.01);
(Continued)

(58) Field of Classification Search
CPC ........ H02K 16/02; H02K 1/17; H02K 1/2766; H02K 1/2793; H02K 1/30; H02K 31/02; H02K 3/04
(Continued)

(56) References Cited

U.S. PATENT DOCUMENTS

| 2,703,370 | A | 3/1955 | Steensen |
| 3,300,663 | A | 1/1967 | Rosaen |

(Continued)

FOREIGN PATENT DOCUMENTS

| AU | 2013235132 B2 | 7/2017 |
| CA | 2881979 C | 4/2021 |
| CN | 2226352 Y | 5/1996 |
| CN | 2452204 Y | 10/2001 |
| CN | 101005229 A | 7/2007 |
| CN | 101212150 B | 5/2011 |

(Continued)

OTHER PUBLICATIONS

Aydin, Metin, et al., "Design and 3D Electromagnetic Field Anaylsis of Non-slotted and Slotted TORUS Type Axial Flux Surface Mounted Permanent Magnet Disc Machines," IEEE International Electric Machines and Drives Conference, Jun. 17-20, 2001, pp. 645-651.

(Continued)

*Primary Examiner* — Alex W Mok
(74) *Attorney, Agent, or Firm* — Bill R. Naifeh

(57) ABSTRACT

This disclosure relates in general to a new and improved system for producing electric energy or mechanical power, and in particular to an improved system and method for producing rotary motion from an electro-magnetic motor or generating electrical power from a rotary motion input by concentrating magnetic forces due to electromagnetism or geometric configurations.

15 Claims, 21 Drawing Sheets

Related U.S. Application Data continuation of application No. PCT/US2013/033198, filed on Mar. 20, 2013.

(60) Provisional application No. 61/613,022, filed on Mar. 20, 2012.

(51) Int. Cl.
  *H02K 1/27* (2006.01)
  *H02K 31/02* (2006.01)
  *H02K 1/17* (2006.01)
  *H02K 1/30* (2006.01)

(52) U.S. Cl.
  CPC .............. *H02K 1/2793* (2013.01); *H02K 1/30* (2013.01); *H02K 16/02* (2013.01); *H02K 31/02* (2013.01)

(58) Field of Classification Search
  USPC ..................................................... 310/154.01
  See application file for complete search history.

(56) References Cited

U.S. PATENT DOCUMENTS

| | | |
|---|---|---|
| 3,469,133 A | 9/1969 | Stcherbatcheff |
| 3,895,245 A | 7/1975 | Bode |
| 3,973,137 A | 8/1976 | Drobina |
| 3,979,619 A | 9/1976 | Whiteley |
| 4,237,396 A | 12/1980 | Blenkinsop |
| 4,371,801 A | 2/1983 | Richter |
| 4,388,547 A | 6/1983 | Gruber |
| 4,441,043 A | 4/1984 | DeCesare |
| 4,488,075 A | 12/1984 | DeCesare |
| 4,538,086 A | 8/1985 | Marsh |
| 4,547,713 A | 10/1985 | Langley et al. |
| 4,629,921 A | 12/1986 | Gavaletz |
| 4,739,201 A | 4/1988 | Brigham et al. |
| 4,814,651 A | 3/1989 | Elris |
| 5,004,944 A | 4/1991 | Fisher |
| 5,099,158 A | 3/1992 | Stuart et al. |
| 5,245,238 A | 9/1993 | Lynch et al. |
| 5,594,289 A | 1/1997 | Minato |
| 5,691,589 A | 11/1997 | Keim et al. |
| 5,821,710 A | 10/1998 | Masuzawa |
| 5,825,113 A | 10/1998 | Lipo |
| 5,886,450 A | 2/1999 | Kuehnle |
| 5,962,947 A | 10/1999 | Suzuki et al. |
| 5,977,684 A | 11/1999 | Lin |
| 6,054,834 A | 4/2000 | Ha |
| 6,093,986 A | 7/2000 | Windhorn |
| 6,104,108 A | 8/2000 | Hazelton |
| 6,211,597 B1 | 4/2001 | Nakano |
| 6,388,352 B1 | 5/2002 | Huang |
| 6,462,430 B1 | 10/2002 | Houng et al. |
| 6,531,799 B1 | 3/2003 | Miller |
| 6,664,689 B2 | 12/2003 | Rose |
| 6,664,704 B2 | 12/2003 | Calley |
| 6,774,591 B2 | 8/2004 | Arimitsu et al. |
| 6,803,691 B2 | 10/2004 | Rose |
| 6,806,607 B2 | 10/2004 | Lau |
| 6,891,299 B2 | 5/2005 | Coupart |
| 6,924,574 B2 | 8/2005 | Qu et al. |
| 6,924,579 B2 | 8/2005 | Calley |
| 6,930,421 B2 | 8/2005 | Rose |
| 6,930,422 B2 | 8/2005 | Rose |
| 6,967,424 B2 | 11/2005 | Popov |
| 6,975,055 B2 | 12/2005 | Joong et al. |
| 6,979,925 B2 | 12/2005 | Schwamm |
| 6,998,757 B2 | 2/2006 | Seguchi et al. |
| 7,049,722 B2 | 5/2006 | Rose |
| 7,233,088 B2 | 6/2007 | Wise |
| 7,279,818 B1 | 10/2007 | Wise |
| 7,315,103 B2 | 1/2008 | Qu |
| 7,348,703 B2 | 3/2008 | Bojiuc |
| 7,378,749 B2 | 5/2008 | Moore |
| 7,554,241 B2 | 6/2009 | Rao |
| 7,576,465 B2 | 8/2009 | Bremner |
| 7,732,973 B2 | 6/2010 | Bojiuc |
| 7,755,244 B2 | 7/2010 | Ley et al. |
| 7,765,905 B2 | 8/2010 | Trumper |
| 7,791,242 B2 | 9/2010 | Bojiuc |
| 7,834,503 B2 | 11/2010 | Bojiue |
| 7,898,134 B1 | 3/2011 | Shaw |
| 8,008,821 B2 | 8/2011 | Calley |
| 8,063,528 B2 | 11/2011 | Toot |
| 8,074,922 B2 | 12/2011 | Bojiuc |
| 8,159,104 B1 | 4/2012 | Bojiuc |
| 8,232,695 B2 | 7/2012 | Bojiuc |
| 8,288,916 B2 | 10/2012 | Quere |
| 8,362,731 B2 | 1/2013 | Smith |
| 8,400,037 B2 | 3/2013 | Wojtowicz |
| 8,415,848 B2 | 4/2013 | Calley |
| 8,598,754 B2 | 12/2013 | Lacour |
| 8,816,554 B2 | 8/2014 | Li et al. |
| 8,847,464 B2 | 9/2014 | Qu |
| 8,912,699 B2 | 12/2014 | Kuntz |
| 8,994,238 B2 | 3/2015 | Kamibayashi |
| 9,219,962 B2 | 12/2015 | Hunstable |
| 9,287,745 B2 | 3/2016 | Akatsu et al. |
| 9,419,483 B2 | 8/2016 | Hunstable |
| RE46,449 E | 6/2017 | Bojiuc |
| 9,729,016 B1 | 8/2017 | Hunstable |
| 9,825,496 B2 * | 11/2017 | Hunstable ................ H02K 1/17 |
| 9,876,407 B2 | 1/2018 | Walsh |
| 10,125,814 B2 | 11/2018 | Walsh |
| 10,256,680 B2 | 4/2019 | Hunstable |
| 10,263,480 B2 | 4/2019 | Hunstable |
| 10,284,029 B2 | 5/2019 | Hunstable |
| 10,326,343 B2 | 6/2019 | Walsh |
| 10,340,768 B2 | 7/2019 | Walsh |
| 10,439,452 B2 | 10/2019 | Hunstable |
| 10,447,103 B2 | 10/2019 | Hunstable |
| 10,476,362 B2 | 11/2019 | Hunstable |
| 11,018,536 B2 | 5/2021 | Igwemezie |
| 2003/0025417 A1 | 2/2003 | Rose |
| 2004/0027022 A1 | 2/2004 | Weir |
| 2004/0061397 A1 | 4/2004 | Rose |
| 2004/0194286 A1 | 10/2004 | Rose |
| 2004/0195932 A1 | 10/2004 | Rose |
| 2004/0195933 A1 | 10/2004 | Rose |
| 2004/0232800 A1 | 11/2004 | Seguchi et al. |
| 2005/0194855 A1 | 9/2005 | Hasebe |
| 2006/0038454 A1 | 2/2006 | Bojiuc |
| 2006/0055272 A1 | 3/2006 | Lee et al. |
| 2006/0273686 A1 | 12/2006 | Edelson et al. |
| 2007/0228860 A1 | 10/2007 | Rao |
| 2008/0278019 A1 | 11/2008 | Lu et al. |
| 2009/0102305 A1 | 4/2009 | Lu |
| 2009/0224627 A1 | 9/2009 | Hino et al. |
| 2009/0224628 A1 | 9/2009 | Hiwaki et al. |
| 2009/0261675 A1 | 10/2009 | Hsiao et al. |
| 2010/0164422 A1 | 7/2010 | Shu et al. |
| 2010/0289365 A1 | 11/2010 | Bando et al. |
| 2011/0187222 A1 | 8/2011 | Li et al. |
| 2011/0309708 A1 | 12/2011 | Van Neste |
| 2012/0153763 A1 | 6/2012 | Kenji |
| 2012/0286616 A1 | 11/2012 | Li |
| 2013/0249343 A1 | 9/2013 | Hunstable |
| 2013/0334902 A1 | 12/2013 | Oiwa et al. |
| 2013/0334937 A1 | 12/2013 | Yamada et al. |
| 2014/0062236 A1 | 3/2014 | Taniguchi et al. |
| 2014/0070651 A1 | 3/2014 | Gerfast |
| 2014/0191612 A1 | 7/2014 | Mariotto |
| 2015/0001976 A1 | 1/2015 | Hunstable |
| 2015/0137647 A1 | 5/2015 | Hunstable |
| 2015/0171694 A1 | 6/2015 | Walsh |
| 2016/0020652 A1 | 1/2016 | Hunstable |
| 2016/0094096 A1 | 3/2016 | Hunstable |
| 2016/0380496 A1 | 12/2016 | Hunstable |
| 2017/0163115 A1 | 6/2017 | Gotz |
| 2017/0222494 A1 | 8/2017 | Hunstable |
| 2017/0237325 A1 | 8/2017 | Hunstable |
| 2018/0131244 A1 | 5/2018 | Hunstable |
| 2018/0212486 A1 | 7/2018 | Hunstable |

(56) References Cited

U.S. PATENT DOCUMENTS

| | | |
|---|---|---|
| 2018/0219464 A1 | 8/2018 | Newmark et al. |
| 2018/0278134 A1 | 9/2018 | Hunstable |
| 2019/0103793 A1 | 4/2019 | Walsh |
| 2019/0199185 A1 | 6/2019 | Hunstable |
| 2019/0229563 A1 | 7/2019 | Hunstable |
| 2019/0260243 A1 | 8/2019 | Hunstable |
| 2019/0312497 A1 | 10/2019 | Walsh |
| 2019/0356251 A1 | 11/2019 | Hunstable |
| 2020/0007016 A1 | 1/2020 | Hunstable |
| 2020/0083759 A1 | 3/2020 | Hunstable |
| 2020/0112212 A1 | 4/2020 | Hunstable |
| 2021/0066984 A1 | 3/2021 | Hunstable et al. |
| 2021/0067016 A1 | 3/2021 | Hunstable et al. |

FOREIGN PATENT DOCUMENTS

| | | | |
|---|---|---|---|
| CN | 102687378 A | 9/2012 | |
| CN | 102761179 A | 10/2012 | |
| CN | 102761211 A | 10/2012 | |
| CN | 102792569 A | 11/2012 | |
| CN | 103683768 A | 3/2014 | |
| CN | 104272559 A | 1/2015 | |
| CN | 104285366 A | 1/2015 | |
| CN | 104285366 B | 10/2017 | |
| CN | 107710569 A | 2/2018 | |
| CN | 107925328 A | 4/2018 | |
| CN | 107925328 B | 4/2018 | |
| CN | 109891726 A | 6/2019 | |
| CN | 109891726 B | 3/2021 | |
| DE | 102010024344 A1 | 12/2011 | |
| EP | 3729663 B1 | 5/2001 | |
| EP | 1191673 A2 | 3/2002 | |
| EP | 1990894 A2 | 11/2008 | |
| EP | 2828962 B1 | 5/2021 | |
| JP | S51133709 | 11/1976 | |
| JP | S5492305 | 12/1977 | |
| JP | 558116050 A | 7/1983 | |
| JP | S61173658 A | 8/1986 | |
| JP | S61144782 | 9/1986 | |
| JP | 2002-254268 A | 9/2002 | |
| JP | 2002369473 A | 12/2002 | |
| JP | 2006217771 A | 8/2006 | |
| JP | 2008-043127 A | 2/2008 | |
| JP | 2008141853 A | 6/2008 | |
| JP | 2010166741 A | 7/2010 | |
| JP | 2010166741 A * | 7/2010 | |
| JP | 2010-226937 A | 10/2010 | |
| JP | 2015-177646 A | 10/2015 | |
| JP | 6223418 B2 | 10/2017 | |
| JP | 2019-527022 A | 9/2019 | |
| KR | 1020070092089 A | 7/2008 | |
| KR | 1020090033866 A | 2/2010 | |
| KR | 101276633 B1 | 6/2013 | |
| KR | 10-2048601 B1 | 11/2019 | |
| KR | 10-2150817 | 8/2020 | |
| WO | 2008/006906 A1 | 1/2008 | |
| WO | 2008096913 A1 | 8/2008 | |
| WO | 2011032675 A2 | 3/2011 | |
| WO | 2014188737 A | 11/2014 | |
| WO | 2016014717 A | 1/2016 | |
| WO | WO-2016014717 A1 * | 1/2016 | ............. H02K 51/00 |
| WO | 2016164818 A1 | 10/2016 | |
| WO | 2017003955 A1 | 1/2017 | |
| WO | 2017070403 A1 | 4/2017 | |
| WO | 2018045360 A1 | 3/2018 | |
| WO | 2020150536 A1 | 7/2020 | |

OTHER PUBLICATIONS

Aydin, Metin, et al., "Performance Evaluation of an Axial Flux Consequent Pole PM Motor using Finite Element Analysis," IEEE International Electric Machines and Drives Conference, vol. 3, Jun. 1-4, 2003, pp. 1682-1687.

Huang, Surong, et al., "TORUS Concept Machines: Pre-Prototyping Design Assessment for Two Major Topologies," IEEE Industry Applications Conference, vol. 3, Sep. 30-Oct. 4, 2001, pp. 1619-1625.

Australian Exam Report, dated May 10, 2016, re Patent App No. 2013235132; 3 pages.

Chinese Office Action, dated Jul. 20, 2016, re Patent App No. 201380022180.7; 9 pages.

Japanese Office Action, dated Jan. 25, 2017, re JP Patent App No. 2015-501894.

International Search Report and Written Opinion of the ISA, dated Aug. 8, 2014, re PCT/US2013/033198.

International Search Report and Written Opinion of the ISA, dated Aug. 18, 2016, re PCT/US2016/026776.

International Search Report and Written Opinion, dated Nov. 3, 2016, by the ISA/RU, re PCT/US2016/039673.

International Search Report and Written Opinion, dated Jan. 9, 2017, by the ISA/US, re PCT/US2016/057999.

Chinese Office Action, dated Apr. 19, 2017, re CN App No. 201380022180.7.

Office Action, dated Jul. 21, 2017, by the USPTO, re U.S. Appl. No. 15/413,228.

Office Action, dated Nov. 6, 2017, by the USPTO, re U.S. Appl. No. 14/866,787.

Final Office Action, dated Mar. 9, 2018, by the USPTO, re U.S. Appl. No. 15/413,228.

International Search Report and Written Opinion, dated Mar. 15, 2018, by the ISA/RU, re PCT/US2017/049981.

Notice of Allowance, dated Mar. 29, 2018, by the USPTO, re U.S. Appl. No. 14/866,787.

Office Action, dated Jun. 27, 2018, by the USPTO, re U.S. Appl. No. 15/008,431.

Office Action, dated Sep. 19, 2018, by the USPTO, re U.S. Appl. No. 15/413,228.

Notice of Allowance, dated Apr. 26, 2018, by the USPTO, re U.S. Appl. No. 14/866,787.

Notice of Allowance, dated Sep. 12, 2018, by the USPTO, re U.S. Appl. No. 14/866,787.

Ep Exam Report, dated Apr. 18, 2018, by the EPO, re EP App No. 13714168.5.

EP Search Report, dated Oct. 26, 2018, re EP Patent App No. 16777421.5.

EP Official Action, dated Nov. 13, 2018, by the EPO, re EP App No. 16777421.5.

Notice of Allowance, dated Dec. 26, 2018, by the USPTO, re U.S. Appl. No. 14/866,787.

EP Exam Report, dated Oct. 10, 2018, by the EPO, re EP App No. 13714168.5.

Indian Exam Report, dated Nov. 19, 2018, by IP India, re IN App No. 8335/DELNP/2014.

CA Office Action, dated Jan. 24, 2019, by the CIPO, re CA App No. 2,881,979.

Office Action, dated Feb. 25, 2019, by the USPTO, re U.S. Appl. No. 15/848,540.

EP Extended Search Report, dated Feb. 22, 2019, by the EPO, re EP App No. 16818559.3.

Notice of Allowance, dated Mar. 6, 2019, by the USPTO, re U.S. Appl. No. 15/008,431.

EP Office Action, dated Mar. 12, 2019, by the EPO, re EP App No. 16818559.3.

Notice of Allowance, dated Apr. 10, 2019, by the USPTO, re U.S. Appl. No. 15/413,228.

Extended EP Search Report, dated Apr. 18, 2019, by the EPO, re EP App No. 16858253.4.

CN Office Action, dated Apr. 10, 2019, by the CIPO, re CN Patent App No. 201680033171.1.

EP Official Action, dated May 8, 2019, by the EPO, re EP Patent App No. 16858253.4.

Notice of Allowance, dated May 31, 2019, by the USPTO, re U.S. Appl. No. 16/374,132.

Notice of Allowance, dated Jun. 12, 2019, by the USPTO, re U.S. Appl. No. 15/848,540.

(56) References Cited

OTHER PUBLICATIONS

CN Office Action, dated Jun. 5, 2019, by the CIPO, re CN Patent App No. 201680050018.X.
Notice of Allowance, dated Jun. 24, 2019, by the USPTO, re U.S. Appl. No. 15/008,431.
KR Office Action, dated Jun. 7, 2019, by the KIPO, re KR Patent App No. 10-2014-7029089.
CN Office Action, dated Jul. 9, 2019, by the CIPO, re CN Patent App No. 201680061215.1.
EP Exam Report, dated Aug. 9, 2019, by the EPO, re EP Patent App No. 13714168.5.
CN Office Action, dated Sep. 12, 2019, by the CIPO, re Patent App No. 201680033171.1.
BR Office Action, dated Dec. 3, 2019, by the Brazil Patent Office, re BR Patent App No. BR112014023183-4.
EP Official Action, dated Dec. 10, 2019, by the EPO, re EP Patent App No. 16858253.4.
CA Office Action, dated Jan. 8, 2020, by the CIPO re CA App No. 2,881,979.
EP Official Action, dated Jan. 29, 2020, by the EPO, re EP Patent App No. 16777421.5.
KR Office Action, dated Feb. 3, 2020, by the KIPO, re KR App No. 10-2019-7033838.
AU Office Action, dated Feb. 26, 2020, by IP Australia, re AU App No. 201634225.
EP Extended Search Report, dated Mar. 17, 2020, by the EPO, re EP App No. 17847669.3.
Office Action, dated Apr. 15, 2020, by the USPTO, re U.S. Appl. No. 16/601,529.
Office Action, dated Apr. 16, 2020, by the USPTO, re U.S. Appl. No. 16/506,137.
International Search Report, dated Apr. 16, 2020, by the ISA/RU, re PCT/US2020/013966.
Written Opinion, dated Apr. 16, 2020, by the ISA/RU, re PCT/US2020/013966.
EP Exam Report, by the EPO, dated Apr. 17, 2020, re EP App No. 16818559.3.
CN second Office Action, dated May 29, 2020, by the CIPO, re CN App No. 201680061215.1.
EP Exam Report, by the EPO, dated Jun. 9, 2020, re EP App No. 13714168.5.
IN Exam Report, dated Jul. 6, 2020, by the India Patent Office, re IN App No. 201817013288.
Notice of Allowance, dated Jul. 23, 2020, by the USPTO, re U.S. Appl. No. 16/601,529.
Office Action, dated Aug. 4, 2020, by the USPTO, re U.S. Appl. No. 16/404,631.
EP Official Action, dated Apr. 4, 2020, by the EPO, re EP App No. 17847669.3.
CN Office Action, dated Sep. 2, 2020, re CN App No. 201780054222.3.
Office Action-Restriction, dated Sep. 4, 2020, by the USPTO, re U.S. Appl. No. 16/293,515.
BR Exam Report, dated Aug. 25, 2020, by the BPO, re BR App No. BR112018007810-7.
EP Communication pursuant to Article 94(3) EPC, dated Oct. 14, 2020, re EP App No. 16858253.4.
EP Exam Report, dated Oct. 15, 2020, by the EPO, re EP App No. 16818559.3.
Notice of Allowance, dated Oct. 5, 2020, by the USPTO, re U.S. Appl. No. 16/385,344.
Final Office Action, dated Oct. 30, 2020, by the USPTO, re U.S. Appl. No. 16/506,137.
Office Action, dated Oct. 30, 2020, by the USPTO, re U.S. Appl. No. 15/977,120.
Notice of Allowance, dated Nov. 12, 2020, by the USPTO, re U.S. Appl. No. 16/601,529.
JP Office Action, dated Oct. 15, 2020, by JPO, re JP App No. 2018-540691.
Office Action, dated Nov. 25, 2020, by the USPTO, re U.S. Appl. No. 16/566,132.
Notice of Allowance, dated Nov. 25, 2020, by the USPTO, re U.S. Appl. No. 16/404,631.
Notice of Allowance, dated Dec. 10, 2020, by the USPTO, re U.S. Appl. No. 16/293,515.
Notice of Allowance, dated Feb. 2, 2021, by the USPTO, re U.S. Appl. No. 16/385,344.
Office Action, dated Feb. 22, 2021, by the USPTO, re U.S. Appl. No. 16/506,137.
Notice of Allowance, dated Mar. 3, 2021, by the USPTO, re U.S. Appl. No. 16/601,529.
Notice of Allowance, dated Mar. 24, 2021, by the USPTO, re U.S. Appl. No. 16/404,631.
Notice of Allowance, dated Mar. 26, 2021, by the USPTO, re U.S. Appl. No. 15/977,120.
Notice of Allowance, dated May 19, 2021, by the USPTO, re U.S. Appl. No. 16/385,344.
IN Exam Report, dated May 14, 2021, by the India Patent Office, re IN App No. 2019/17006820.
Final Office Action, dated Jun. 18, 2021, by the USPTO, re U.S. Appl. No. 16/506,137.
Notice of Allowance, dated Jun. 23, 2021, by the USPTO, re U.S. Appl. No. 15/977,120.
Notice of Allowance, dated Jun. 23, 2021, by the USPTO, re U.S. Appl. No. 16/601,529.
Notice of Allowance, dated Jul. 9, 2021, by the USPTO, re U.S. Appl. No. 16/404,631.
JP Office Action, dated Jul. 8, 2021, re JP Patent App No. 2019-512779.
Notice of Allowance, dated Aug. 18, 2021, by the USPTO, re U.S. Appl. No. 16/293,515.

\* cited by examiner

DC ELECTRIC MOTOR/GENERATOR WITH ENHANCED PERMANENT MAGNET FLUX DENSITIES

CROSS REFERENCE TO RELATED APPLICATIONS

This application is a Continuation of U.S. patent application Ser. No. 14/490,656, filed on Sep. 18, 2014, entitled "DC Electric Motor/Generator with Enhanced Permanent Magnet Flux Densities," which is a Continuation of PCT international patent application serial no. PCT/US2013/033198, filed Mar. 20, 2013, entitled "An Improved DC Electric Motor/Generator with Enhanced Permanent Magnet Flux Densities," and also claims the benefit of the filing date of U.S. provisional patent application Ser. No. 61/613,022, filed on Mar. 20, 2012, entitled "Electric Motor Generator," the disclosures of which are also incorporated by reference for all purposes.

TECHNICAL FIELD

The invention relates in general to a new and improved electric motor/generator, and in particular to an improved system and method for producing rotary motion from an electro-magnetic motor or generating electrical power from a rotary motion input.

BACKGROUND INFORMATION

Electric motors use electrical energy to produce mechanical energy, very typically through the interaction of magnetic fields and current-carrying conductors. The conversion of electrical energy into mechanical energy by electromagnetic means was first demonstrated by the British scientist Michael Faraday in 1821 and later quantified by the work of Hendrik Lorentz.

A magnetic field is generated when electric charge carriers such as electrons move through space or within an electrical conductor. The geometric shapes of the magnetic flux lines produced by moving charge carriers (electric current) are similar to the shapes of the flux lines in an electrostatic field. Magnetic flux passes through most metals with little or no effect, with certain exceptions, notably iron and nickel. These two metals, and alloys and mixtures containing them, are known as ferromagnetic materials because they concentrate magnetic lines of flux. Areas of greatest field strength or flux concentration are known as magnetic poles.

In a traditional electric motor, a central core of tightly wrapped current carrying material creates magnetic poles (known as the rotor) which spins or rotates at high speed between the fixed poles of a magnet (known as the stator) when an electric current is applied. The central core is typically coupled to a shaft which will also rotate with the rotor. The shaft may be used to drive gears and wheels in a rotary machine and/or convert rotational motion into motion in a straight line.

Generators are usually based on the principle of electromagnetic induction, which was discovered by Michael Faraday in 1831. Faraday discovered that when an electrical conducting material (such as copper) is moved through a magnetic field (or vice versa), an electric current will begin to flow through that material. This electromagnetic effect induces voltage or electric current into the moving conductors.

Current power generation devices such as rotary alternator/generators and linear alternators rely on Faraday's discovery to produce power. In fact, rotary generators are essentially very large quantities of wire spinning around the inside of very large magnets. In this situation, the coils of wire are called the armature because they are moving with respect to the stationary magnets (which are called the stators). Typically, the moving component is called the armature and the stationary components are called the stator or stators.

Motors and generators used today produce or utilize a sinusoidal time varying voltage. This waveform is inherent to the operation of these devices.

In most conventional motors, both linear and rotating, enough power of the proper polarity must be pulsed at the right time to supply an opposing (or attracting) force at each pole segment to produce a particular torque. In conventional motors at any given instant only a portion of the coil pole pieces is actively supplying torque.

With conventional motors a pulsed electrical current of sufficient magnitude must be applied to produce a given torque/horsepower. Horsepower output and efficiency then is a function of design, electrical input power plus losses.

With conventional generators, an electrical current is produced when the rotor is rotated. The power generated is a function of flux strength, conductor size, number of pole pieces and speed in RPM. However output is a sinusoidal output with the same losses as shown in conventional electric motors.

A conventional linear motor/generator, on the other hand, may be visualized as a typical electric motor/generator that has been cut open and unwrapped. The "stator" is laid out in the form of a track of flat coils made from aluminum or copper and is known as the "primary" of a linear motor. The "rotor" takes the form of a moving platform known as the "secondary." When the current is switched on, the secondary glides past the primary supported and propelled by a magnetic field. A Linear generator works in the same manner but mechanical power provides the force to move the rotor or secondary past magnetic fields.

In traditional generators and motors, the pulsed time varying magnetic fields produces undesired effects and losses, i.e. Iron Hystersis losses, Counter-EMF, inductive kickback, eddy currents, inrush currents, torque ripple, heat losses, cogging, brush losses, high wear in brushed designs, commutation losses and magnetic buffeting of permanent magnets. In many instances, complex controllers are used in place of mechanical commutation to address some of these effects.

In motors and generators that utilize permanent magnets it is desirable to increase magnetic flux densities to achieve more efficient operation. Most permanent magnet motor/generators used today rely on permanent magnets such as Neodymium magnets. These magnets are the strongest of the man made magnetic materials. Due to their strategic value to industry and high costs it is desirable to increase flux densities without relying on a breakthrough in material composition of these magnets or manufacturing high density special purpose magnet shapes and sizes.

In motors or generators, some form of energy drives the rotation and/or movement of the rotor. As energy becomes more scarce and expensive, what is needed are more efficient motors and generators to reduce energy costs.

SUMMARY

In response to these and other problems, there is presented various embodiments disclosed in this application, including methods and systems of increasing flux density by permanent magnet manipulation. Specifically, methods and systems of increasing flux density utilizing commercially available shapes or sizes that can be chosen based on lower cost rather than flux density. Also described are methods of producing mechanical power by moving a coil/s coupled to a core into a magnet assembly with an increased flux density or producing an electrical output power when the coils are mechanically forced through the magnetic assembly with an increased flux density. In certain aspects, within the magnetic cylinder or magnet assembly magnetic flux lines are created and increased by the configuration of permanent magnets or electromagnets and are restrained within the magnetic cylinder or magnet assembly until exiting at predetermined locations.

In certain aspects presented herein, non-pulsating or non-sinusoidal DC current is applied to the power terminals which produces a Lorentz force at each length of coil conductor. This force is applied continuously throughout the entire rotation of the rotor hub without variations in amplitude or interruptions in output power. There are no pole pieces to provide magnetic attraction or repulsion consequently, there is reduced torque ripple, polarity reversals or interruptions in power output while the poles are in the process of reversing, thus producing more efficient output than traditional motors When certain aspects of the disclosed embodiments are used as a generator non pulsating or non-sinusoidal DC current is produced at the power terminals. A Lorentz force at each length of coil conductor and across all coils induces an output current flow. This output is supplied continuously throughout the entire rotation of the rotor hub without variations in amplitude, polarity reversals, or interruptions in output power. There are no pole pieces to provide magnetic attraction or repulsion which produces a current output more efficiently than traditional generators.

Certain aspects of the disclosure reduces or eliminates the undesired effects and losses of traditional generators and motors discussed above, including Iron Hystersis losses, Counter-EMF, inductive kickback, eddy currents, inrush currents, torque ripple, heat losses, cogging, brush losses, sparking and high wear in brushed designs, commutation losses and magnetic buffeting of permanent magnets.

In summary, certain aspects of the various disclosed embodiments may provide the following benefits:

Unlike conventional brush rectified or PWM controller motor/generators, the coils in aspects of this invention are in continuous contact with the Permanent Magnet field and thus produce a non-varying continuous torque or output.

Complex PWM drives and controllers, commutators, etc (and the associated losses) may not be not required since certain aspects of the invention produce and utilize DC current directly.

If automatic speed control for a given load is required, complex position indication is not required. A much simpler RPM indication and a varying voltage/current relationship is all that is required to control speed.

Using the magnetic cylinder/single pole magnet assembly concept utilizing permanent magnets an otherwise unachievable, extremely strong magnetic field is generated without consuming any electrical power.

Though a Counter EMF field is produced by any induced current flow, due to the magnet cylinder and core design there is no direct impact on coil movement that hinders such movement.

Iron Hysteresis losses are essentially eliminated as only two points on the core experience any hysteresis loss at all and then only twice per revolution.

Eddy current losses are essentially eliminated as the core does not move perpendicular to the flux lines Cogging is also essentially eliminated as the core forces are balanced and equal in all directions There is little inrush current as there is no need to saturate large masses of iron 100% of the copper windings in the coil is utilized to take advantage of Lorentz forces thus there is no wasted copper winding as in conventional motor/generators.

Inductive kickback from the rising and collapsing sinusoidal waveform is eliminated Like other DC motors reversal of torque is simply a reversal of input polarities.

These and other features, and advantages, will be more clearly understood from the following detailed description taken in conjunction with the accompanying drawings.

It is important to note the drawings are not intended to represent the only aspect of the invention.

BRIEF DESCRIPTION OF THE DRAWINGS

FIG. 9b is an isometric view of the assembled magnetic cylindrical coil assembly of FIG. 9a.

DETAILED DESCRIPTION

Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry, power supplies, or circuitry used to power certain components or elements described herein are omitted, as such details are within the skills of persons of ordinary skill in the relevant art.

When directions, such as upper, lower, top, bottom, clockwise, or counter-clockwise are discussed in this disclosure, such directions are meant to only supply reference directions for the illustrated figures and for orientation of components in the figures. The directions should not be read to imply actual directions used in any resulting invention or actual use. Under no circumstances, should such directions be read to limit or impart any meaning into the claims.

Most motors and generators used today require or produce a sinusoidal time varying voltage referred to as Alternating Current (AC). When Direct Current is utilized it must first be inverted and pulsed to replicate an AC waveform to produce the desired current or mechanical output. Certain embodiments of the present invention neither produces nor utilizes Alternating Current but instead directly produces or utilizes a non sinusoidal Direct Current without the need for rectification or commutation. This results in the elimination of Alternating Current Losses and results in a more efficient utilization of input or output power. However, certain aspects of the invention may accept any rectified A/C current and thus may be "blind" to input power supply phasing. Thus, simple rectified single phase, two phase, three phase power, etc. are all acceptable for input power depending on the configuration.

Figure 1:
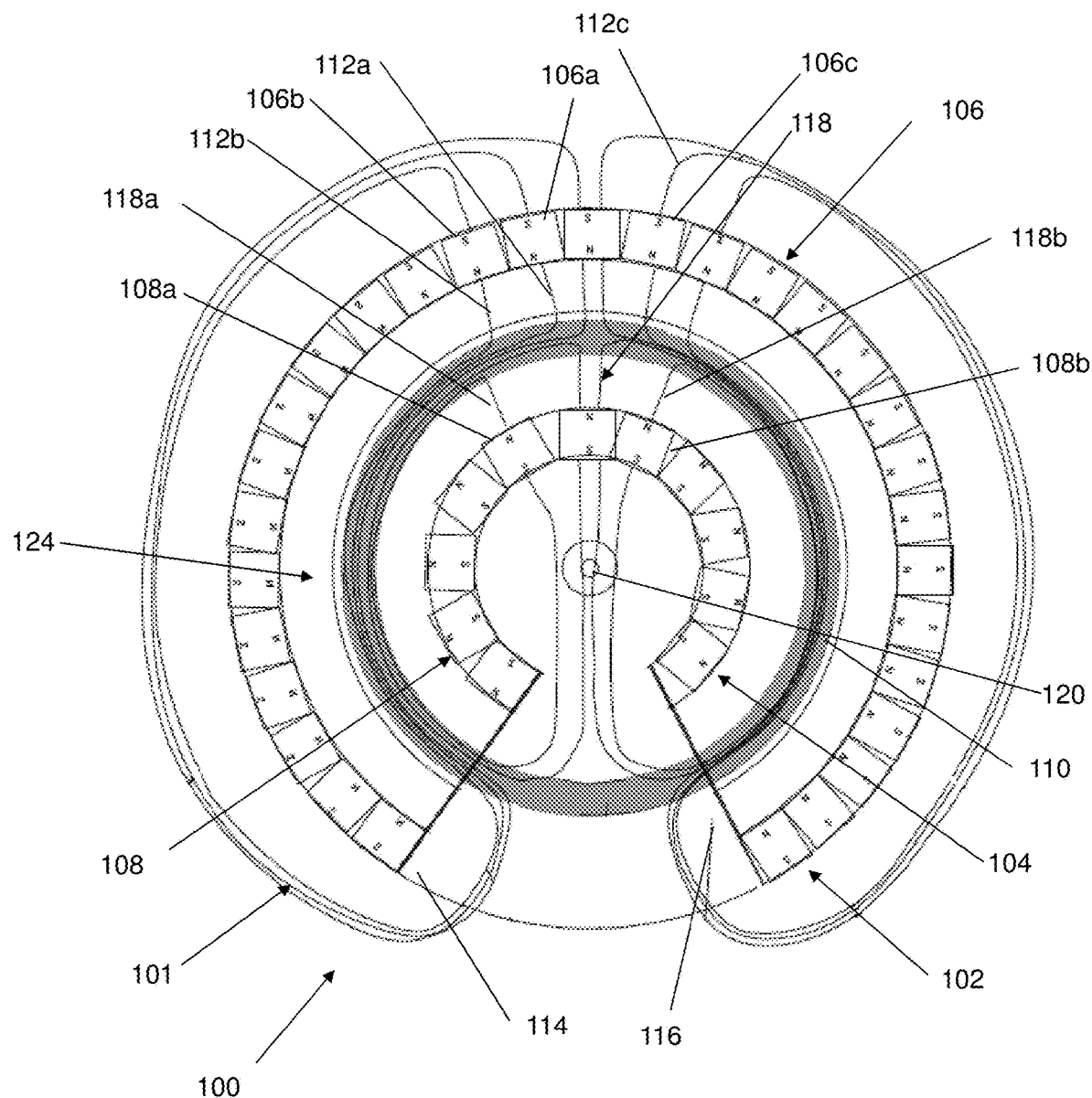
FIG. 1 is a cross-sectional view of a toroidal magnetic cylinder illustrating representative "planar" portions of magnetic flux paths within and around the cylinder with an iron core.

Turning now to FIG. 1, there is a cross-sectional view of one embodiment of a toroidal magnetic cylinder 100 illustrating representative planar magnetic flux paths 101 within and around the cylinder. These are representative illustrations; actual flux paths are dependent on the material design and specific configuration of the magnets within the cylinder. The magnetic cylinder 100 comprises an outer cylinder wall of 102 and an inner cylinder wall 104. The outer cylinder wall 102 and inner cylinder wall 104 may be made with a plurality of magnets. In a lateral section view, such as illustrated in FIG. 1, it can be seen that the outer cylinder wall 102 is comprised of a plurality of magnets 106, comprising individual magnets, such as magnets 106a, 106b, 106c, etc. Similarly, the inner cylinder wall 104 may be comprised with a plurality of magnets 108, comprising individual magnets 108a, 108b, etc. It should be noted that only one polarity of the magnets are utilized within (or facing into) the magnetic cylinder or magnet assembly.

In certain embodiments, there may be a central iron core 110 positioned between the outer wall 102 and the inner wall 104, however other core materials maybe used when design considerations such as strength, reduction of eddy currents, cooling channels, etc. are considered.

In certain embodiments, the plurality of magnets 106 and magnets 108 may be made of out any suitable magnetic material, such as: neodymium, Alnico alloys, ceramic permanent magnets, or electromagnets. In certain embodiments, each magnet 106a or 108a in the respective plurality of magnets has the dimensions of 1"×1"×1." The exact number of magnets or electromagnets will be dependent on the required magnetic field strength or mechanical configuration. The illustrated embodiment is only one way of arranging the magnets, based on certain commercially available magnets. Other arrangements are possible—especially if magnets are manufactured for this specific purpose.

When the plurality of magnets 106 and 108 are arranged into the outer wall 102 and inner wall 104 to form the cylinder 100, the flux lines 101 will form particular patterns as represented in a conceptual manner by the flux lines illustrated in FIG. 1. The actual shape, direction, and orientation of the flux lines 101 depend on factors such as the use of an interior retaining ring, material composition and configuration. For example, the flux line 112a from the magnet 106a on the exterior wall 102 tends to flow from the north pole of the magnet in a perpendicular manner from the face of the magnet around the interior of the cylinder 100, through the iron core 110, exiting through an open end 114, then flow around the exterior of the cylinder 100, and back to an exterior face of the magnet 106a containing its south pole. Similarly, the flux line 112b from the magnet 106b on the exterior wall 102 tends to flow from the north pole of the magnet in a perpendicular manner from the face of the magnet around the interior of the cylinder 100, through the iron core 110, exiting through the open end 114, then flow around the exterior of the cylinder 100, and back to the face of the magnet 106b containing its south pole. Although only a few flux lines 112 are illustrated for purposes of clarity, each successive magnet in the plurality of magnets will produce similar flux lines. Thus, the magnetic flux forces for each successive magnet in the plurality of magnets 106 tend to follow these illustrative flux lines or patterns 112 for each successive magnetic disc in the plurality of magnets 106 until the magnets at the open ends 114 or 116 of the magnetic cylinder 100 are reached.

Magnets on the opposing side of the cylinder 100, such as magnet 106c tend to generate flux lines 112c from the magnet 106c on the exterior wall 102 which tends to flow from the north pole of the magnet in a perpendicular manner from the face around the interior of the cylinder 100, through the iron core 110, exiting through an open end 114, then flow around the exterior of the cylinder 100, and back to an exterior face of the magnet 106c containing its south pole. Although only a few flux lines 112 on the opposing side of the cylinder 100 are illustrated for purposes of clarity, each successive magnet in the plurality of magnets will produce similar flux lines.

In certain embodiments, the interior wall 104 also produces flux lines 118. For instance, the flux line 118a from the magnet 108a on the interior wall 104 tends to flow from the north pole in a perpendicular manner from the face of the magnet, around the interior wall 104 via the iron core 110, and back through the radial center of the interior wall 104 to the face of the magnet 108a containing its south pole. Similarly, the flux line 118b from the magnet 108b on the interior wall 104 tends to flow from the north pole in a perpendicular manner from the face of the magnet, around the interior wall 104 via the iron core 110, and back through the radial center of the interior wall 104, then back to the face of the magnet 108b containing its south pole.

The magnetic flux forces for each successive magnet in the plurality of magnets 108 tend to follow these illustrative flux lines or patterns 118 for each successive magnet in the plurality of magnets 108 until the open ends 114 or 116 of the magnetic cylinder 100 are reached. Thus, the flux produced by the magnets of the interior wall 104 of the cylinder 100 have an unobstructed path to exit through the center of the cylinder and return to its opposing pole on the exterior of the cylinder.

In some embodiments, the magnetic flux lines 112 and 118 will tend to develop a stacking effect and the configuration of the exterior magnetic cylinder manipulates the flux lines 101 of the magnets in the magnetic cylinder 100 such that most or all of the flux lines 110 flows out of the open ends 114 and 116 of the cylinder 100.

In conventional configurations, the opposing poles of the magnets are usually aligned longitudinally. Thus, the field flux lines will "hug" or closely follow the surface of the magnets. So, when using conventional power generating/utilization equipment, the clearances must usually be extremely tight in order to be able to act on these lines of force. By aligning like magnetic poles radially with respect to the center 120 of the cylinder 100, the magnetic flux lines 112 and 118 tend to stack up as they pass through the center of the magnetic cylinder 110 and radiate perpendicularly from the surface of the magnets. This configuration allows for greater tolerances between coils and the magnetic cylinder 100.

In certain embodiments, the iron core 110 is positioned concentrically about the center 120 of the magnetic cylinder 100 such that the iron core is an equidistant radially from the interior wall 104, generating a representative flux pattern 101 as illustrated in FIG. 1. The flux fields or lines are drawn to the iron core 110 and compressed as it approaches the iron core. The flux fields may then establish what can be visualized as a series of "flux walls" surrounding the iron core which extend throughout the cylinder and the exit points.

Figure 2A:
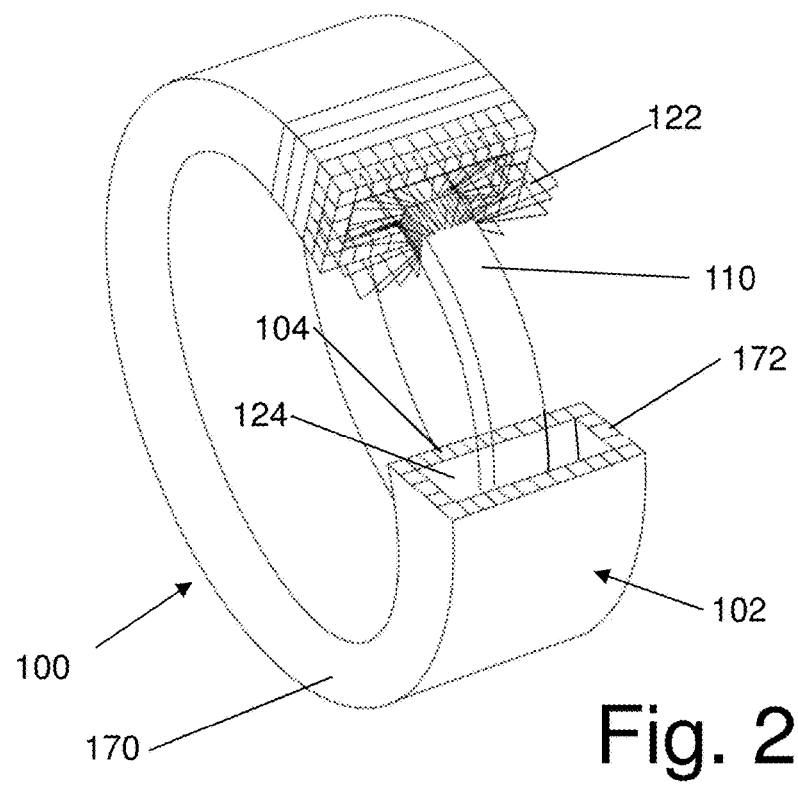
FIG. 2a is an isometric and partial section view of a toroidal magnetic cylinder of FIG. 1.
Figure 2B:
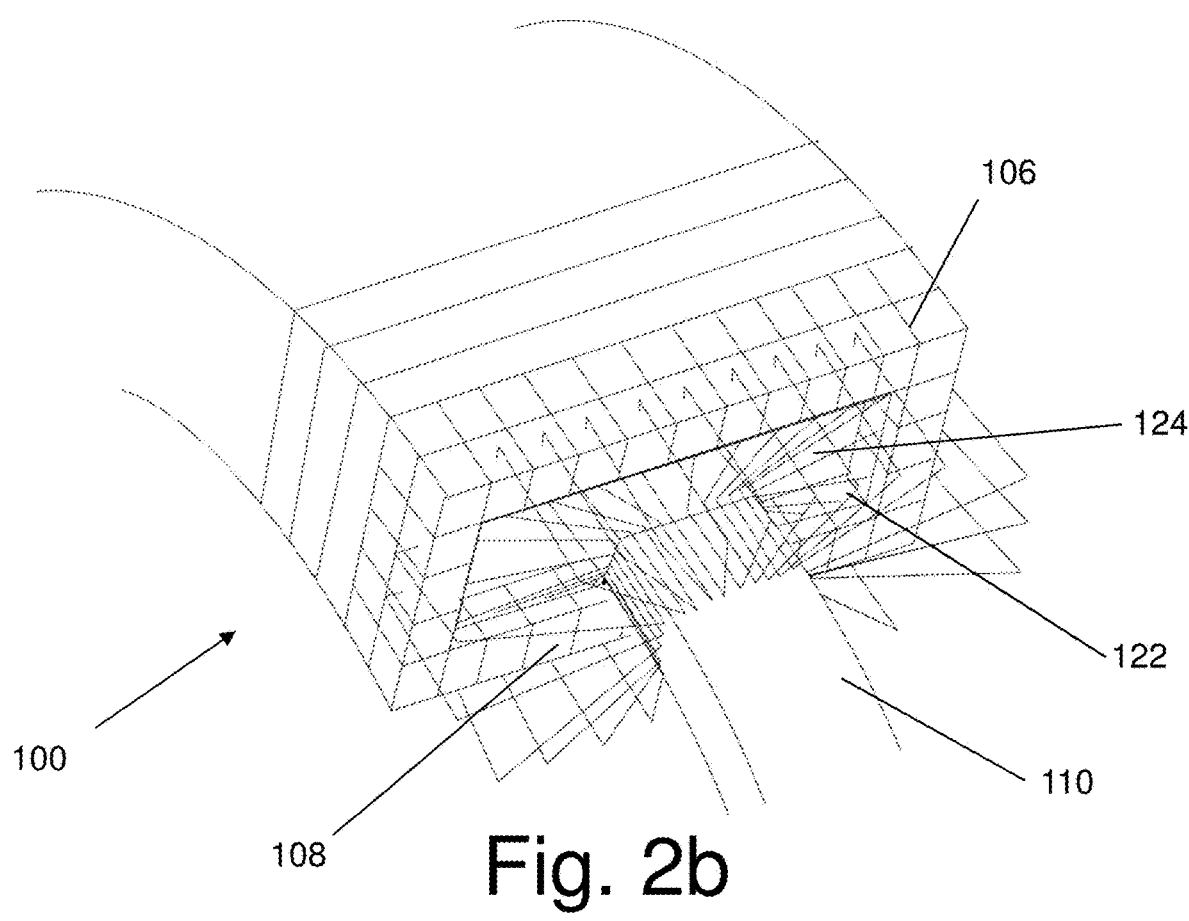
FIG. 2b is a detailed partial section view of the toroidal magnetic cylinder of FIG. 1a illustrating the planar magnetic fields or flux walls generated within the cylinder interior.

Turning now to FIG. 2a, there is presented is a conceptual isometric view of the toroidal magnetic cylinder 100 having the central iron core 110 positioned within the magnetic cylinder. FIG. 2b is a detailed partial view of the toroidal magnetic cylinder 100 illustrating the planar magnetic fields or flux walls 122 generated within the interior cavity 124 of the magnetic cylinder 100 in conjunction with the iron core 110. These are representative illustrations; the actual flux walls 122 are dependent on the material design and configuration.

The cylinder 100 as presented in FIGS. 1, 2a and 2b have been conceptualized to illustrate the basic flux lines or paths of a partial magnetic cylinder with an iron core concentrically located in a hollow portion of its walls. From a practical perspective, a core or rotor assembly may position the core 110 within the magnetic cylinder 100.

Figure 3:
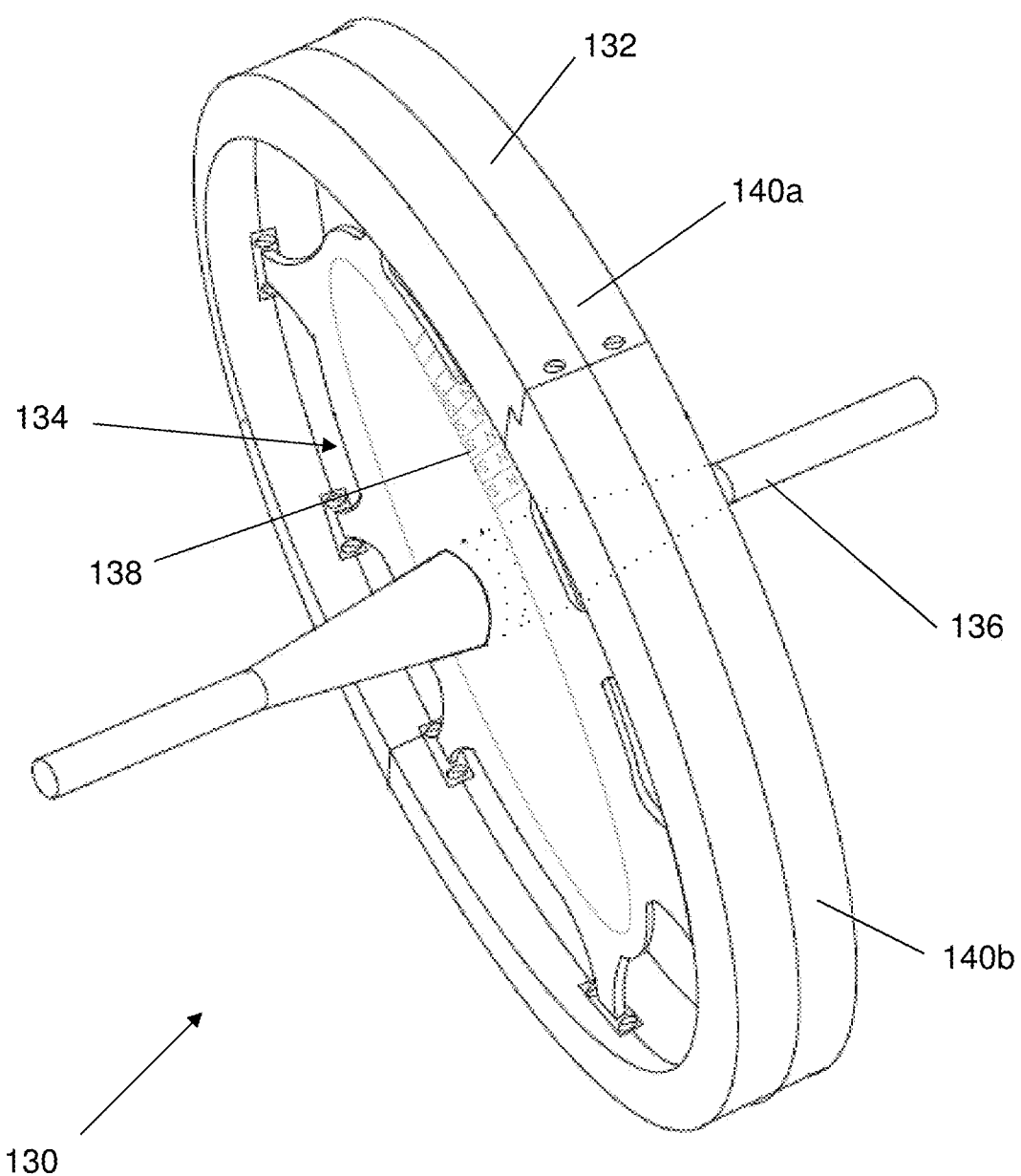
FIG. 3 is a conceptualized isometric view of a rotor hub assembly.

Turning now to FIG. 3, there is presented an isometric view of a one embodiment of a assembly 130 comprising an iron core 132, a rotor hub 134 and shaft 136. The iron core 132 is similar to the core 110 discussed above. The iron core 132 and the rotor hub 134 are fastened to a shaft 136 using conventional fastening methods known in the art. In certain embodiments the rotor hub 134 may be composed of non-ferrous materials for example, to eliminate the production of eddy currents. When assembled with the magnetic cylinder 100, a transverse slot (not shown) in the inner wall 104 of the magnetic cylinder (not shown in FIG. 3) allows the core 132 and a portion of the rotor hub 134 to extend through the inner wall 104 of the magnetic cylinder 100 and into the interior cavity 124 (See FIG. 2b).

In certain embodiments, leakage flux through the transverse slot may be reduced or eliminated by embedding a series or plurality of magnets 138 in a periphery of the rotor hub 134. The plurality of magnets 138 may be oriented similar to the cylinder magnets 106 of the cylinder 100 (not shown in FIG. 3). In certain embodiments, the plurality of magnets 138 will move with the rotor assembly 130.

In other embodiments the iron core 132 may consist of two or more segments 140a and 140b which may be fastened together to form a complete ring or core. This configuration may have the benefit of allowing a plurality of coils to be built on conventional forms then added to ring segments.

Figure 4:
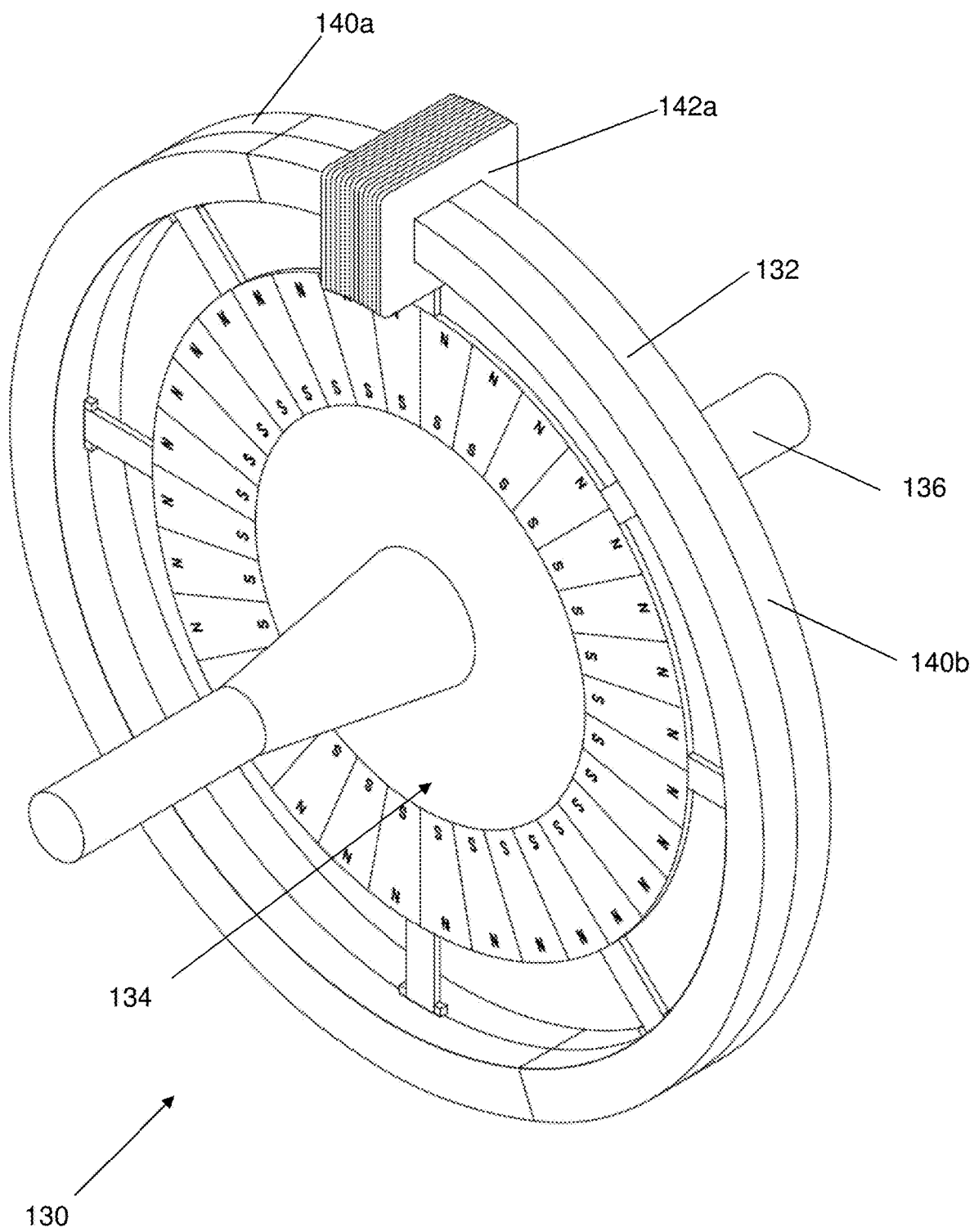
FIG. 4 is a conceptualized isometric view of a rotor hub assembly with a coil positioned on the rotor assembly.

FIG. 4 illustrates an isometric view of the rotor assembly 130 where the core 132 comprises the core segment 140a and the core segment 140b. A single coil 142a is positioned about the core segment 140a. In certain embodiments, there may be a plurality of coils 142 as illustrated in FIG. 5.

Figure 5:
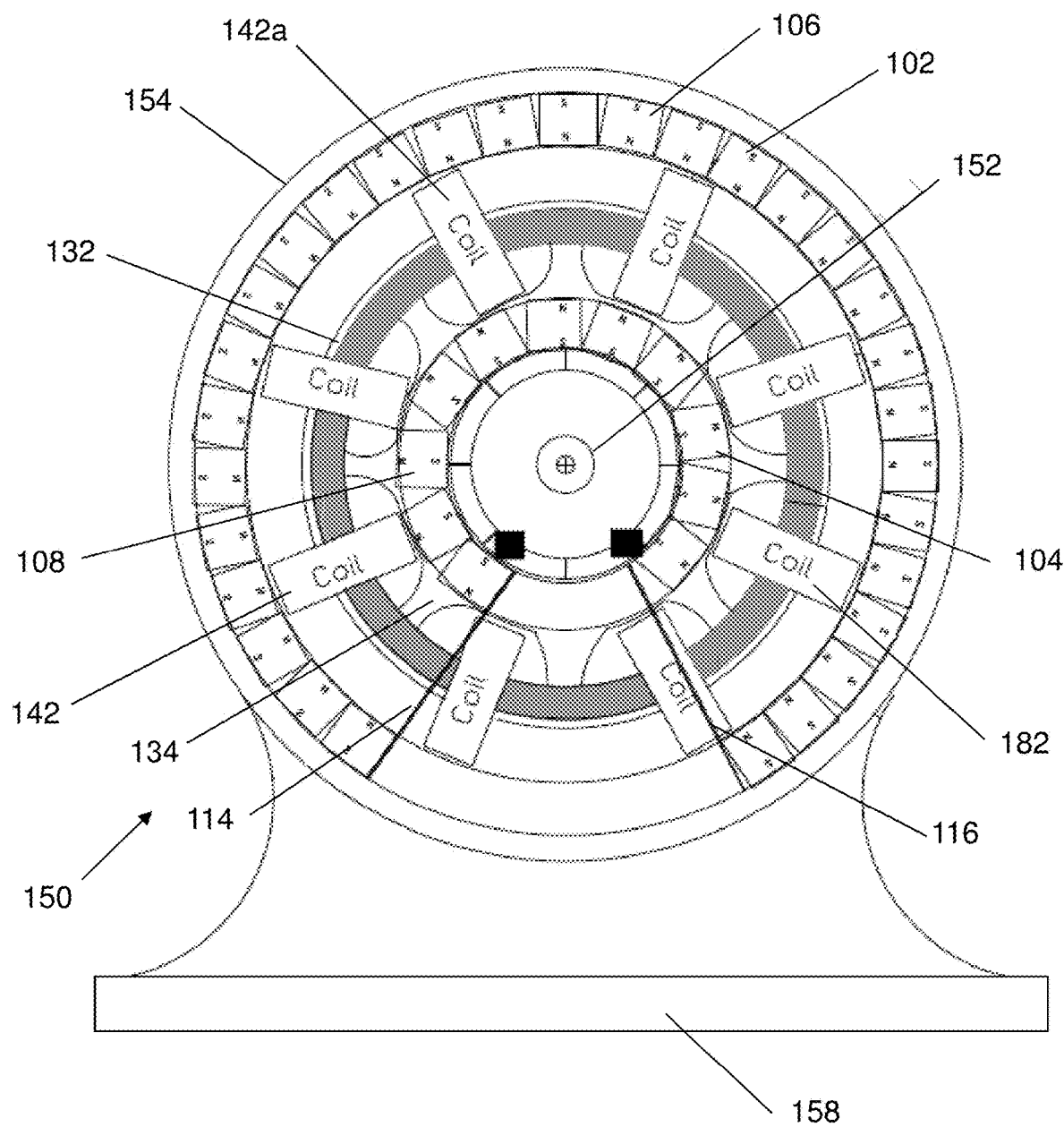
FIG. 5 is a conceptualized lateral section view of an electric motor/generator assembly using the rotor hub assembly illustrating the power terminals and segmented single slip ring brush assembly configuration.
Figure 6:
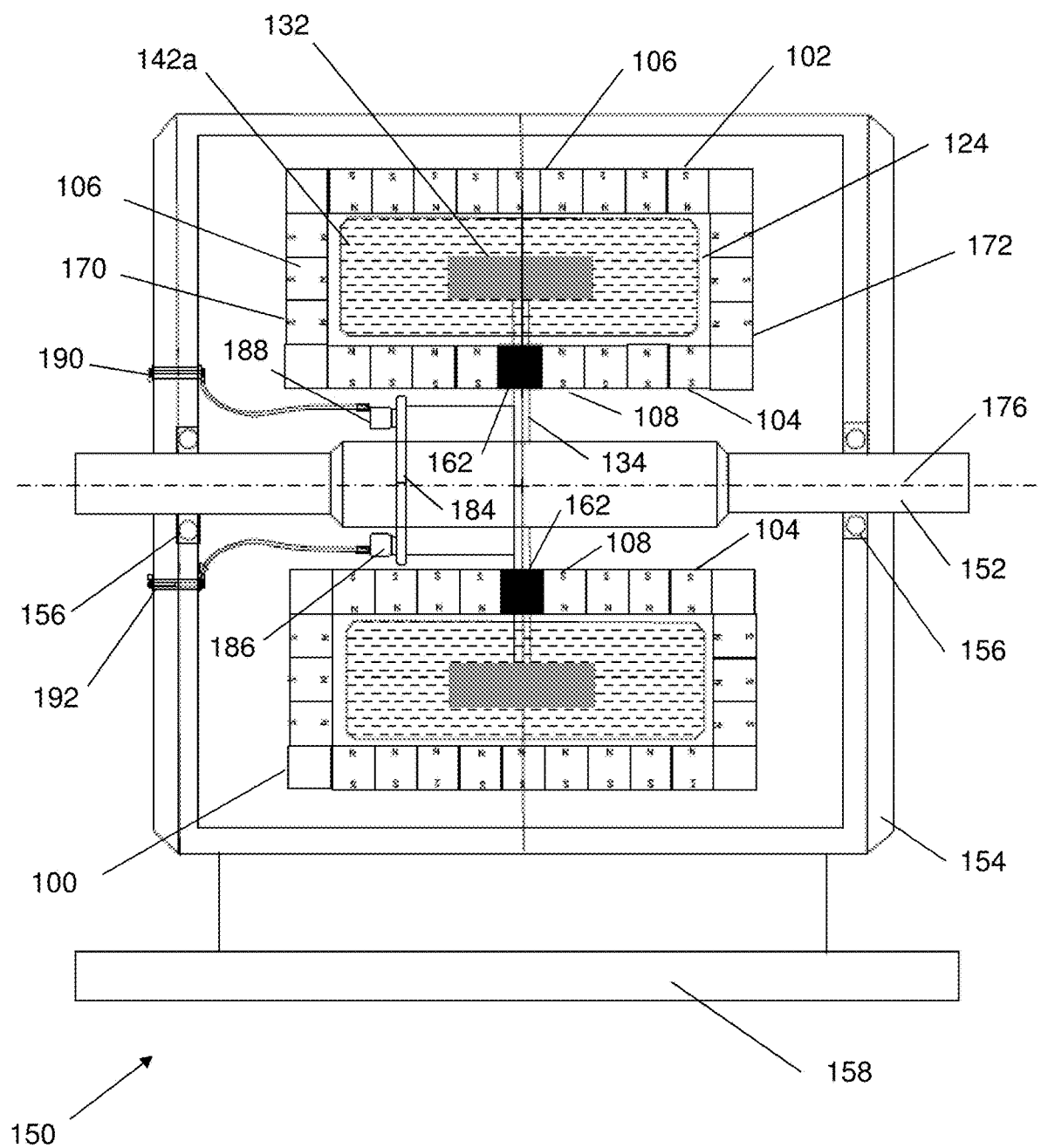
FIG. 6 is a conceptualized longitudinal section view of the electric motor/generator assembly of FIG. 5.
Figure 7:
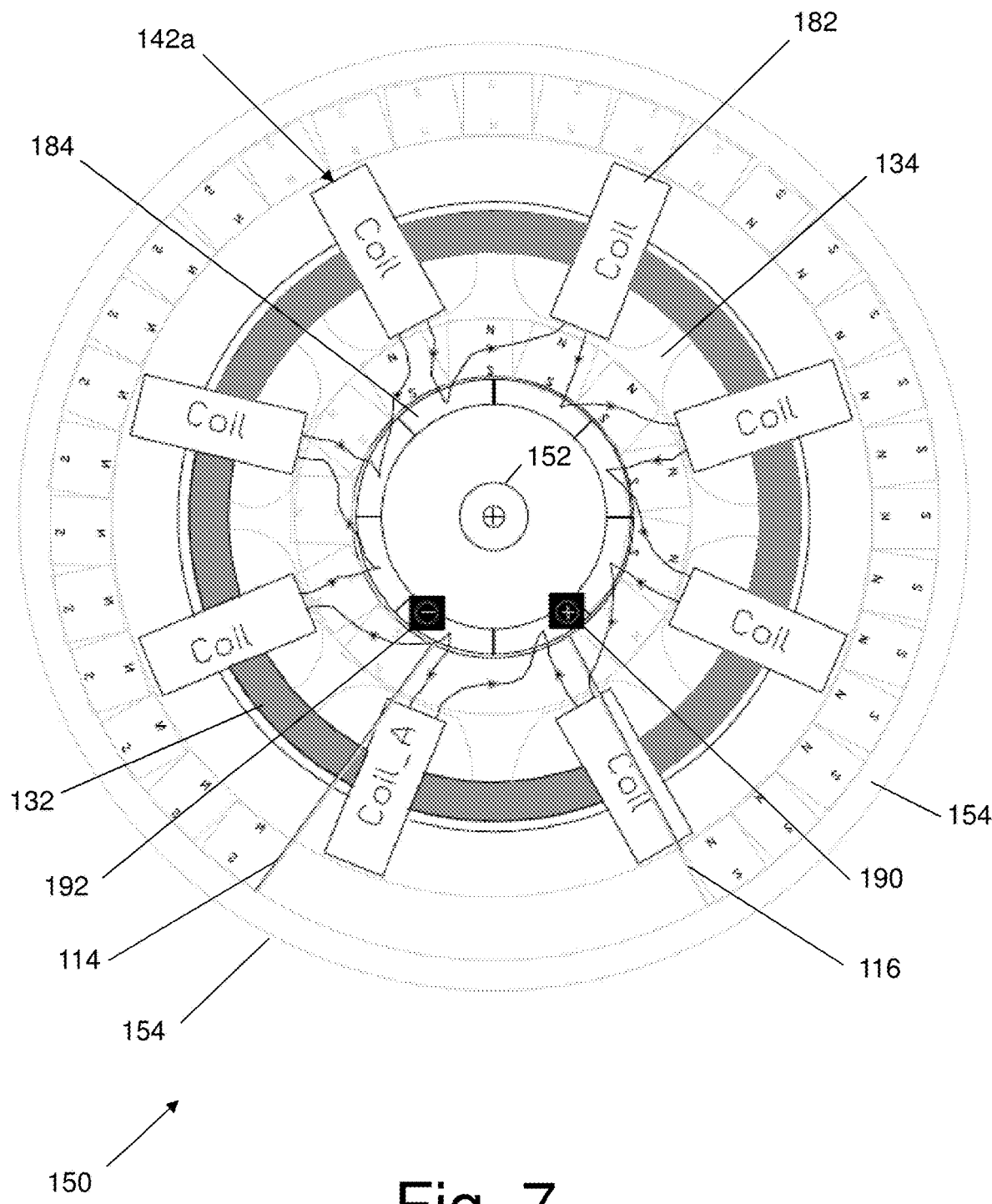
FIG. 7 is a lateral section view illustrating one embodiment of a coupling system between a portion of the coils and the slip ring segments which may be used with the electric motor/generator of FIG. 5.

FIG. 5 is a lateral cross-sectional view of one embodiment of an electric motor/generator assembly 150 which incorporates the magnetic cylinder 100 and the rotor hub 134. FIG. 6 is a longitudinal cross-sectional view of the electric motor/generator assembly 150. The motor/generator assembly 150 may use components similar to the components discussed above, such as the magnetic cylinder 100 and the rotor hub 134. FIG. 7 is a lateral cross-sectional view of one embodiment of an electric motor/generator assembly 150 illustrating additional detail regarding the current paths between individual coils in the plurality of coils 142. The coils illustrated in FIG. 7 are connected in series but any combination of series or parallel connections are possible. Additional brush locations may be added depending on design needs and criteria.

In the illustrative embodiment, the motor/generator assembly 150 has a longitudinal shaft 152. In certain embodiments, the longitudinal shaft 152 may be made from an iron or a ferrite compound with similar magnetic properties to iron. In some embodiments, the ferrite compound or powder may be suspended in a viscous material, such as an insulating liquid, a lubricant, motor oil, gel, or mineral oil.

In certain embodiments, there may be an outer casing or housing 154 which provides structural support for the magnetic cylinder 100 and the longitudinal shaft 152. In certain embodiments, the housing 154 may be formed from any material, alloy, or compound having the required structural strength. In certain embodiments, non-ferrous materials may be used. In some embodiments, external bearings 156 (FIG. 6) may be used to reduce the friction between the longitudinal shaft 152 and the housing 154 or a similar supporting structure. In certain embodiments, the housing 154 may be coupled to a base 158 to provide for structural support for the housing 154.

As described with respect to FIGS. 1, 2a and 2b, the toroidal magnetic cylinder 100 may comprise a plurality of exterior magnets 106 forming the exterior wall 102, a plurality of interior magnets 108 forming the interior wall 104. Additionally, there may first side wall 170 and an opposing side wall 172 which include a plurality of side exterior magnets 168 (see FIGS. 5 and 6).

In certain embodiments, the core 132 as discussed above is positioned concentrically about a longitudinal axis 176 and within the interior cavity 124 of the magnetic cylinder 100. As described above, a transverse slot 160 formed within the interior wall 104 of the magnetic cylinder 100 allows a portion of the rotor hub 134 to be positioned within the interior cavity 124. The rotor hub 134 is also coupled to the core 132 which is also positioned within the interior cavity 124 of the magnetic cylinder 100.

A plurality of coils 148, such as coil 148a are positioned radially about the core 132 to form a coil assembly 182. Each individual coil 178a in the coil assembly 182 may be made from a conductive material, such as copper (or a similar alloy) wire and may be constructed using conventional winding techniques known in the art. In certain embodiments, the individual coils 178a may be essentially cylindrical in shape being wound around a coil core (not shown) having a center opening sized to allow the individual coil 178a to be secured to the core 132.

Although a particular number of coils in the plurality of coils 142 are illustrated in FIGS. 5 and 7, depending on the power requirements of the motor/generator assembly, any number of coils could be used to assemble the coil assembly 182.

In certain embodiments, as illustrated in FIG. 6 and FIG. 7, a plurality of slip ring segments 184 electrically connect the individual coils 142a in the coil assembly 182 in series to each other. Other configurations of coil connections, slip rings and brush injection/pickup points may be utilized. For example, other embodiments may use two non-segmented slip rings and the coils in parallel connection to each other.

In some embodiments, the slip ring segments 184 are in electrical communication with a current source via a plurality of brushes 186 and 188 (FIG. 6) which may also be positioned within the casing 154 to provide current to the plurality of coils 142 in the coil assembly 182. In certain embodiments, the brush 186 may be a positive brush and the brush 188 may be the negative brush. In certain embodiments, inductive coupling may also be used to transfer power to the coils or vice versa.

When in the "motor mode," electric power is applied to power terminals 190 and 192, certain coils in the plurality of coils 142 move through the magnetic cylinder 100 and only "see" "flux walls" similar to the flux walls discussed above in reference to FIG. 2b. The plurality of coils 142 are not substantially affected by the direction of flux within the core 132, thus the plurality of coils move according to the "right hand rule" throughout the cylinder 100. However during the short period of time that certain coils of the plurality of coils 142 are out of the magnetic cylinder 100 itself and traveling through the open segment 194, it is possible they can also contribute to the torque being produced. During this transition period, the flux is now leaving the core 132 on its path to the external walls of the magnetic cylinder 100 which is in the opposite direction to the flux forces within the magnetic cylinder, thus each coil in the plurality of coils 142 has to be supplied with a reverse polarity to contribute torque.

At the contact area for the negative brush 188, the current is divided into two paths, one path is back through the plurality of coils within the magnetic cylinder 100 itself, the other path is routed through the coils positioned in the open segment 194. Thus, the individual coils in the plurality of coils 142 are automatically provided with the correct polarity as illustrated in FIG. 7.

In the generator mode, when the plurality of coils 142 move through the magnetic cylinder 100 as a result of the shaft 152 being rotated, the coils within the magnetic cylinder only see the "flux walls" (as discussed in reference to FIG. 2b). They may not be affected by the direction of flux within the core, thus the coils produce power throughout their travel through the magnetic cylinder 100. However during the short period of time they are out of the cylinder 100 itself and traveling through the open segment 194, it is possible the coils can also contribute to the power being produced. During this transition period when the coils are in the open segment 194, the flux is now leaving the iron core 132 on its path to the external walls 102, 104, 170 and 172 of the magnetic cylinder 100 which is, however in the opposite direction to the flux forces within the magnetic cylinder. Thus, the coil assembly 182 can also produce usable power which can be utilized depending on design needs.

Should it be desired to remove the open segment coil from the circuit, a diode rectifier may be added to one side of each coil to limit current flow to a specific direction.

As is well known, almost all conventional magnets have magnetic poles. Magnetic poles are typically either of two regions of a magnet, typically designated north and south, where the magnetic field or flux density is strongest. FIGS. 8a through 8d illustrate the combinations of typical permanent magnets that may be utilized in magnetic rings or cylinders to create the concentrated flux densities of one magnetic pole (such as the north or south pole). Such magnets may be traditional magnets, electro-magnets, or an electro-permanent magnet hybrid discussed later in this application. Additionally, iron, iron powder or other magnetic material may be added to the cylinder core area for increased magnetic flux densities and concentrations (not shown).

Figure 8A:
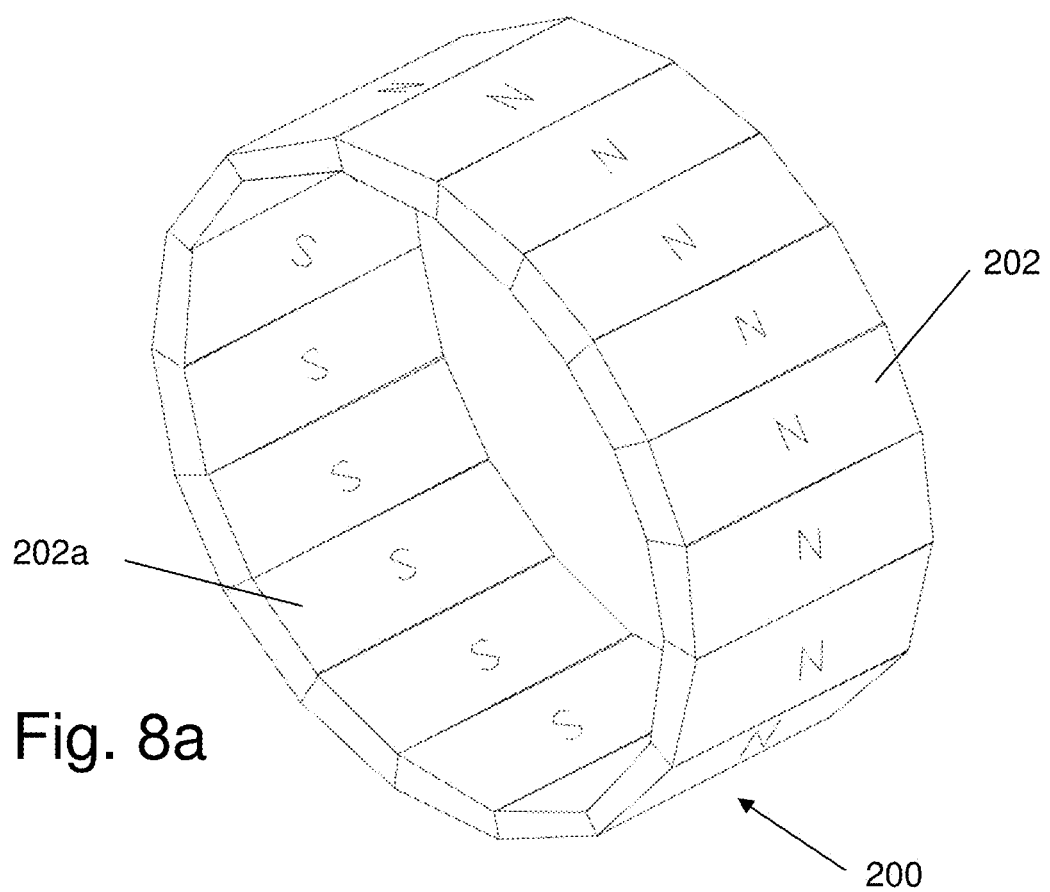
FIG. 8a is an isometric view of a magnetic ring.

Rather than using a magnetic cylinder 100 as described above, an alternative magnetic ring or cylinder 200 can be made of a single row of magnets, such as illustrated in FIG. 8a. As illustrated in FIG. 8a, all of the like or similar poles (e.g. south poles) of the plurality of magnets 202, such as magnet 202a face inward. Such a magnetic ring 200 could be used in a motor or generator, but the strength of the magnetic field or intensity of the flux field (and therefore the motor or generator) would primarily depend on the strength of the individual magnets 202a in the plurality of magnets 202.

Figure 8B:
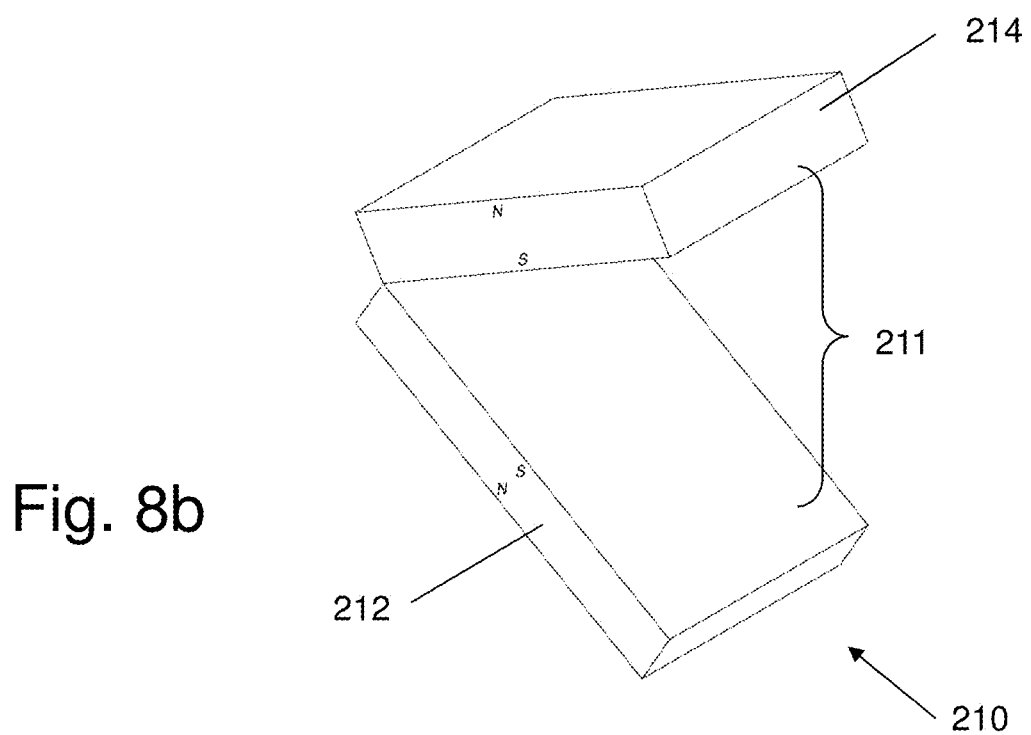
FIG. 8b is a detailed isometric view of a portion of an alternative embodiment of a magnetic ring.

FIG. 8b is an isometric illustration of a portion 210 of a magnetic ring, where each portion 210 comprises a magnet 212 and a magnet 214. Positioning the magnet 212 and magnet 214 so that a magnetic ring has a cross sectional shape of a "V" as illustrated in FIG. 8b and where the like poles face each other increases the strength of the magnetic field or flux density at the throat even if the strength of the individual magnets remain the same. For purposes of this disclosure, such a configuration may be known as a "2×" magnet cylinder assembly, where the term "×" indicates the approximate increase in flux density per magnet surface area (and not necessarily the number of magnets used). Such a configuration may increase the flux density approximately two times at the selected pole exit area 211. Collapsing or compressing the "V" further concentrates the flux density but at the expense of a smaller exit area 211.

Figure 8C:
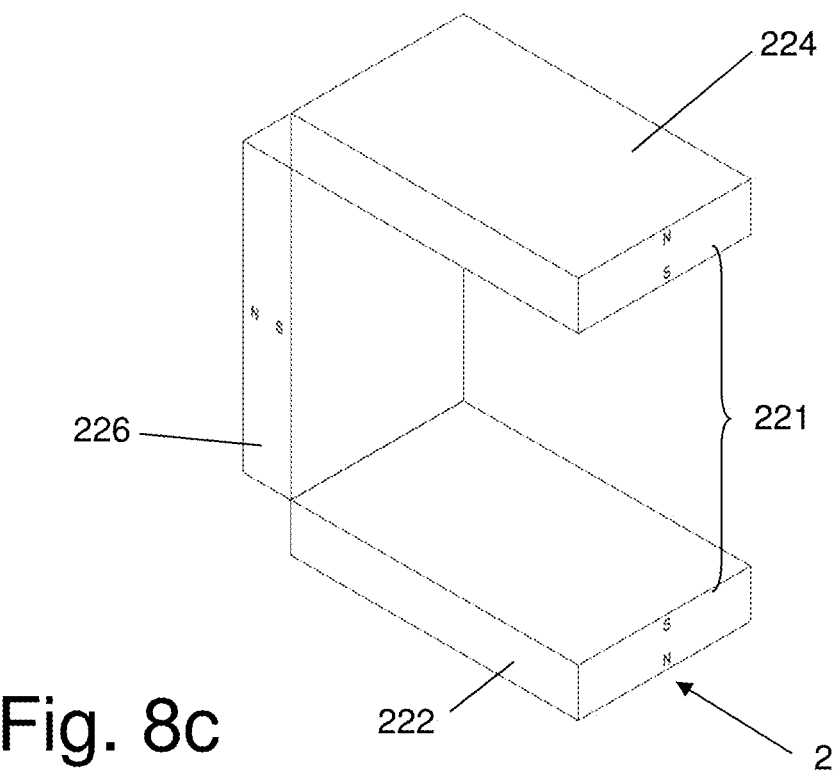
FIG. 8c is a detailed isometric view of a portion of an alternative embodiment of a magnetic ring.

FIG. 8c is an isometric illustration of a portion 220 of a magnetic ring, where each portion 220 comprises a magnet 222, a magnet 224, and a magnet 226. Positioning the magnet 222, the magnet 224, and the magnet 226 so that a magnetic ring has a cross sectional shape of a "U" as illustrated in FIG. 8c and where the like poles face of each magnet faces inward increases the strength of the magnetic field or flux density even if the strength of the individual magnets remain the same. For purposes of this disclosure, such a configuration may be known as a "3×" conceptual magnet cylinder assembly. Such a configuration may increase the flux density approximately three times at the selected pole exit area 221. Collapsing or compressing the "U" (i.e., moving magnet 224 towards magnet 222) further concentrates the flux density but at the expense of a smaller exit area 221.

Figure 8D:
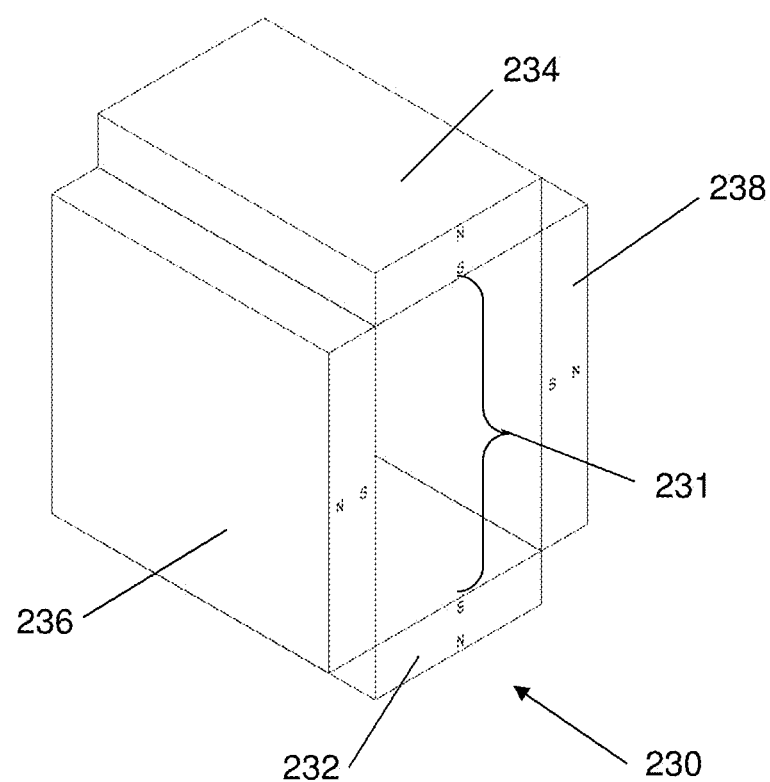
FIG. 8d is a detailed isometric view of a portion of an alternative embodiment of a magnetic ring.

FIG. 8d is an isometric illustration of a portion 230 of a magnetic ring, where each portion 230 comprises a magnet 232, a magnet 234, a magnet 236, a magnet 238, and a magnet 240 (not visible in FIG. 8d). Positioning the magnet 232 opposing the magnet 234 so that their like poles face each other and positioning the magnet 236 opposing the magnet 238 so that their like poles face each other. In other words, all of the south poles of the magnets 236 through 238 face inward. Furthermore, a magnet 240 is positioned on the back face of the "tube" formed by the magnets 232 to 238 to create an open box shape or cube as illustrated in FIG. 8d. For purposes of this disclosure, such a configuration may be known as a "5×" conceptual magnet cylinder assembly. Such a configuration may increase the flux density approximately five times at the selected pole exit area 231. Collapsing or compressing the box area (e.g., moving the magnets 236 towards magnet 238) further concentrates the flux density but at the expense of a smaller exit area 231.

For brevity and clarity, a description of those parts or components which are identical or similar to those described above will not be repeated here. Reference should be made to the foregoing paragraphs with the following description to arrive at a complete understanding of alternative embodiments.

Figure 9A:
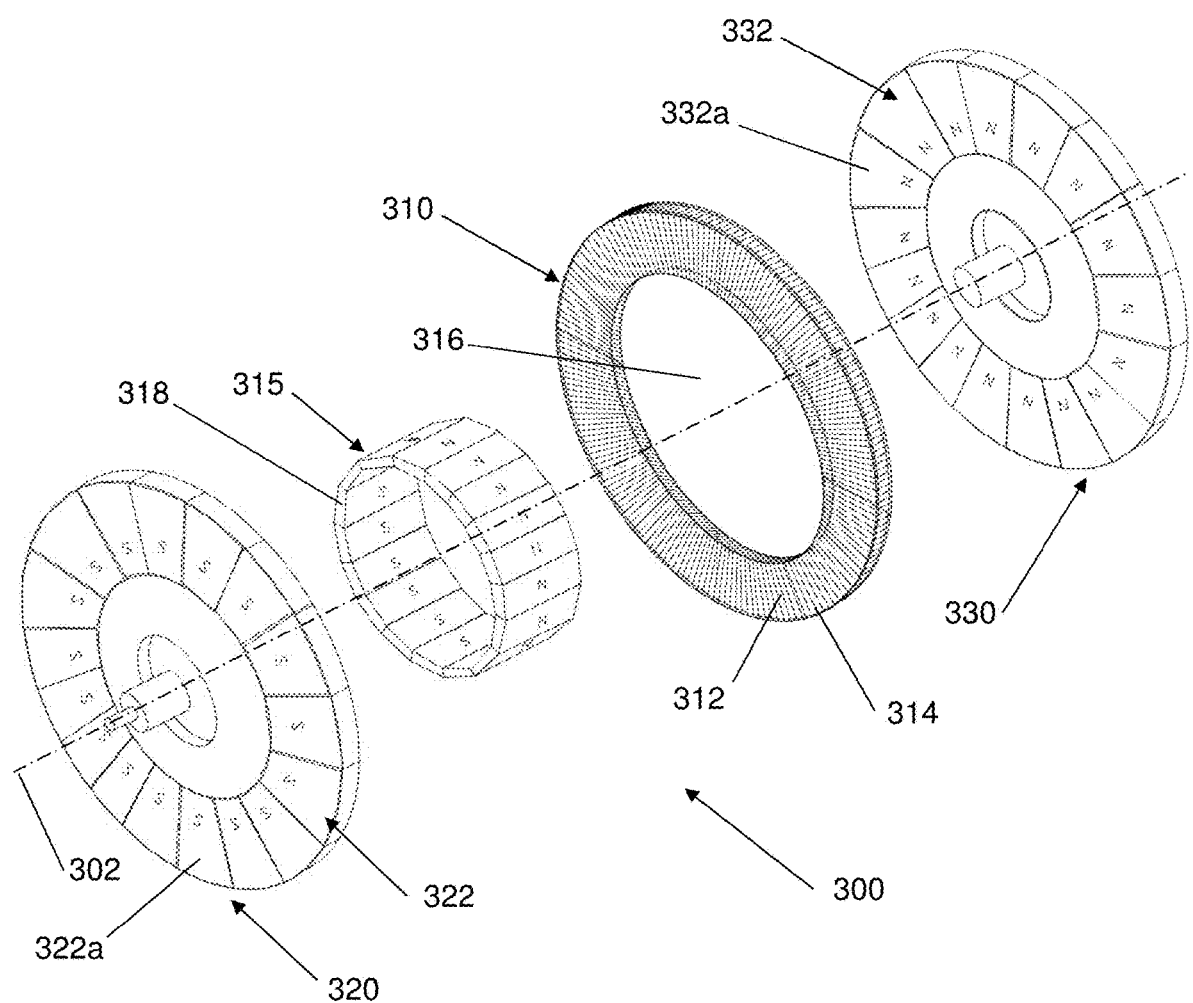
FIG. 9a is an isometric exploded view of a magnetic cylindrical coil assembly.
Figure 9B:
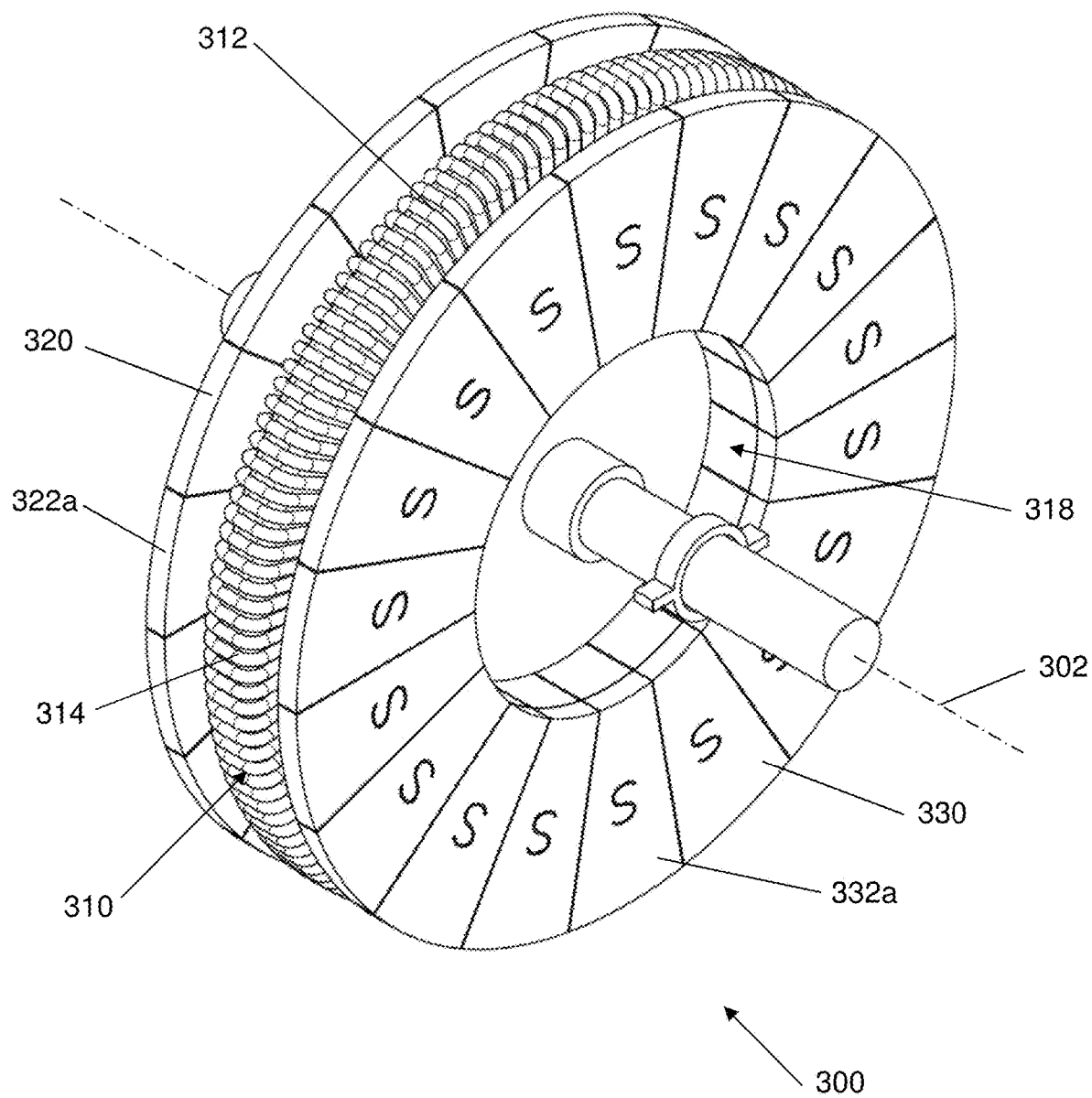
Figure 9C:
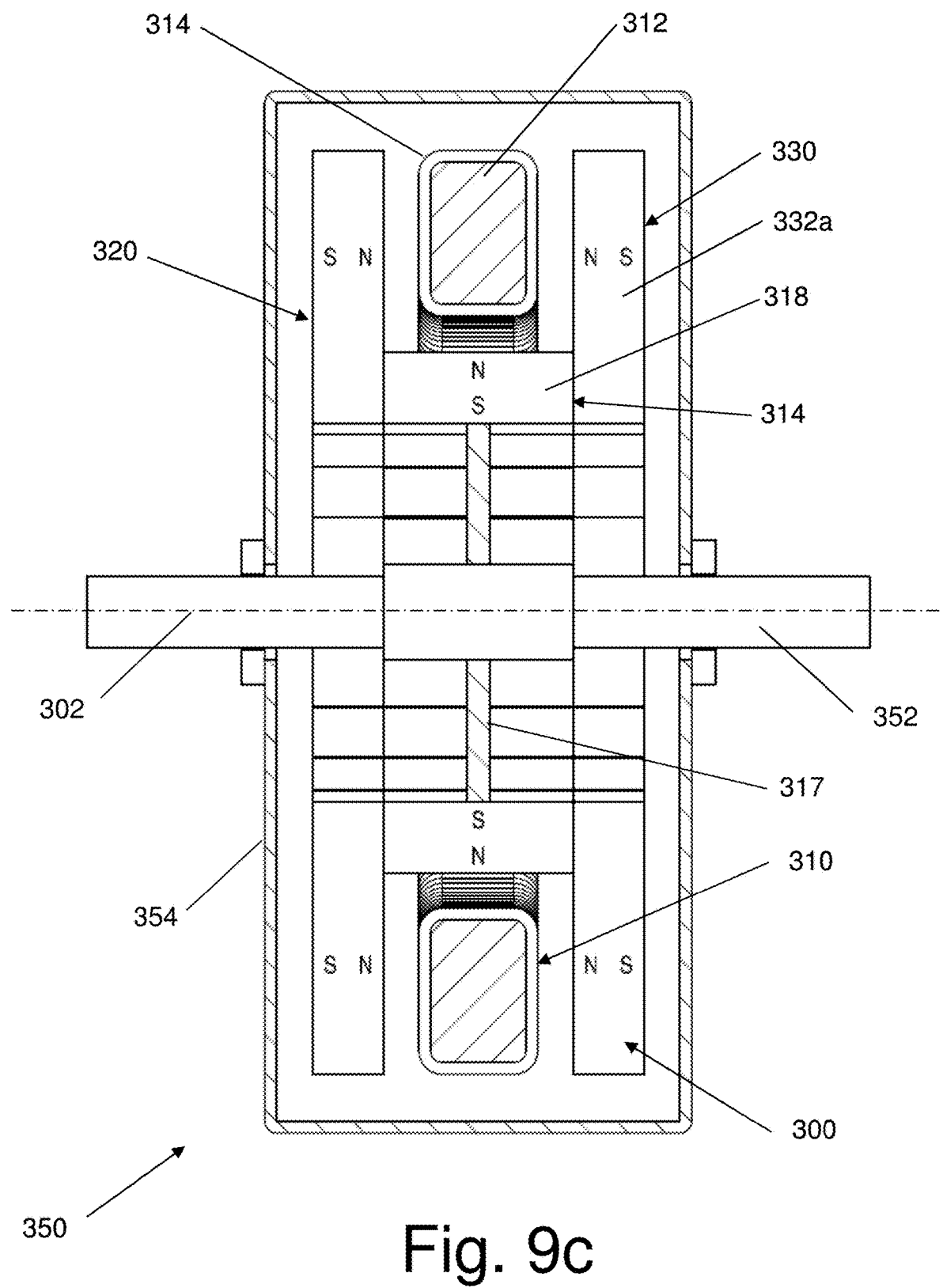
FIG. 9c is a longitudinal section view of the assembled magnetic cylindrical coil assembly of FIG. 9a positioned within a motor/generator assembly.
Figure 9D:
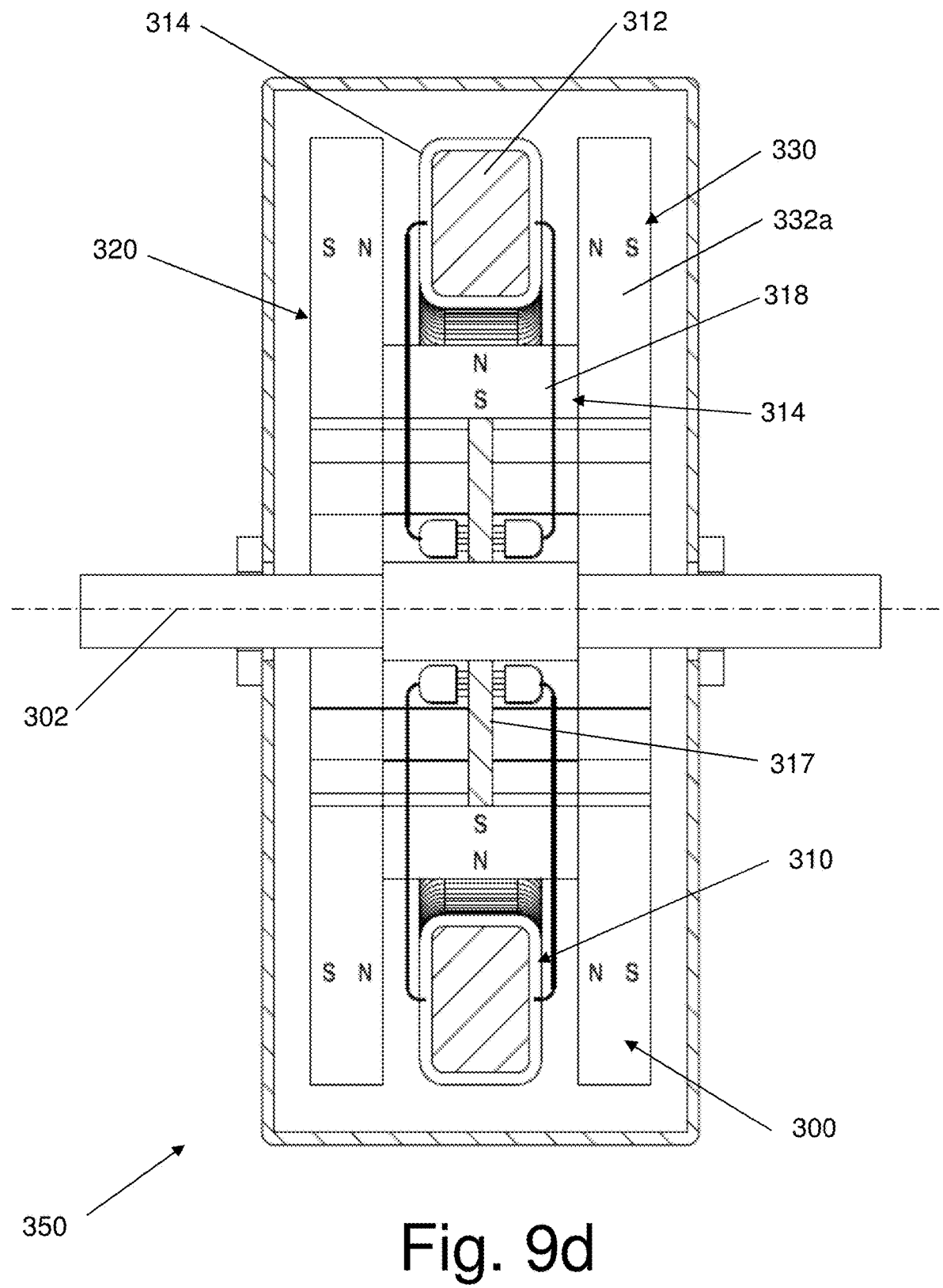
FIG. 9d is a longitudinal section view of the assembled magnetic cylindrical coil assembly of FIG. 9a within the motor/generator assembly of FIG. 9c showing a brush system electrically coupled to various coils of the magnetic cylindrical coil assembly.

Turning now to FIGS. 9a through 9d, there is presented an alternative embodiment or a 3× design which concentrates the magnetic field or flux lines to improve the efficiency of the motor or generator. FIG. 9a is an isometric exploded view of a magnetic cylindrical coil assembly 300. FIG. 9b is an isometric view of the assembled magnetic cylindrical coil assembly 300. FIG. 9c is a longitudinal section view of the assembled magnetic cylindrical coil assembly 300 within a motor/generator assembly 350. FIG. 9d is a longitudinal section view of the assembled magnetic cylindrical coil assembly 300 within a motor/generator assembly 350 showing a brush system electrically coupled to various coils of the magnetic cylindrical coil assembly. Although four brushes per toroid cylinder are shown, the actual number of brushes depend on well known engineering factors, such as wear and current carrying capacity.

Turning now to FIGS. 9a and 9b, there is an enhanced flux toroidal core magnetic cylinder assembly 300. In some aspects, many of these components of the cylinder assembly 300 are assembled utilizing the enhanced magnetic cylinder concepts as described above. Note that only one pole (i.e., either North or South) is used and concentrated throughout the length and breadth of the magnetic cylinder 300.

In certain embodiments, a conductor wrapped coil assembly 310 comprises a core 312 which may be formed of iron, iron powder composite or other magnetic/non-magnetic core material. A conductive material 314, such as copper wire is wrapped around the core 312 to form one or more coils. Thus, the coil assembly 310 may consist of one or more coil segments. Especially in brushless designs, multiple coil segments allows speed control by selectively connecting coil segments in differing combinations of series and parallel connections without changing the system supply voltage. For purposes of example, certain embodiments of the coil assembly 310 may comprise twenty four ("24") coil segments which allows multiple possible combinations of series-parallel connections resulting in multiple output speeds or output power. Where a continuously variable speed or torque requirement are required, input voltages may be adjusted accordingly and if needed, in combination with simple relaying or switched step control of the series-parallel connections between the coil segments. The coil assembly 310 is generally ring shape which allows an interior longitudinal magnetic cylinder 315 to slip through the coil assembly's central aperture 316.

As illustrated, the interior magnetic cylinder 315 comprises a series or plurality of magnets 318 where the north poles face radially outward and transverse to the longitudinal axis 302. Thus, when assembled the north poles of the plurality of magnets 318 would face the core 312 of the coil assembly 310. A first side or end magnetic ring assembly 320 is positioned next to the coil assembly 310. In certain embodiments the first side magnetic ring assembly 320 comprises a plurality of magnets 322 arranged in a radial pattern where the poles of each magnet 322a in the plurality of magnets are generally aligned in a parallel fashion with a longitudinal axis 302. As illustrated the north poles of the plurality of magnets 322 face inward toward the core 312 or the coil assembly 310.

In certain embodiments, a second side or end magnetic ring assembly 330 comprises a plurality of magnets 332 arranged in a radial pattern where the poles of each magnet 332a in the plurality of magnets are generally aligned in a parallel fashion with the longitudinal axis 302. As illustrated the north poles of the plurality of magnets 332 face inward toward the coil assembly 310.

When assembled, it is apparent from discussion regarding FIGS. 8a through 8d, that the coil assembly 300 uses a 3× flux concentrator design to concentrate the flux force intensity or magnetic fields.

FIG. 9c is a longitudinal cross-sectional view of one embodiment of an electric motor/generator assembly 350 which incorporates the magnetic cylinder 300. The motor/generator assembly 350 may use components similar to the components discussed above, such as the magnetic cylinder 100 and the rotor hub 134.

In the illustrative embodiment, the motor/generator assembly 350 has a longitudinal shaft 352. In certain embodiments, the longitudinal shaft 352 may be made from an iron, steel, or a ferrite compound with similar magnetic properties to iron. In certain embodiments, the longitudinal shaft 352 may include a ferrite compound or powder. In some embodiments, the ferrite compound or powder may be suspended in a viscous material, such as an insulating liquid, a lubricant, motor oil, gel, or mineral oil to reduce or eliminate eddy currents and magnetic hysteresis.

In certain embodiments, there may be an outer casing or housing 354 which provides structural support for the magnetic cylinder 300 and the longitudinal shaft 352. In certain embodiments, the housing 354 may be formed from any material, alloy, or compound having the required structural strength. In certain embodiments, non-ferrous materials may be used. In some embodiments, external bearings (not shown) may be used to reduce the friction between the longitudinal shaft 352 and the housing 354 or a similar supporting structure. In certain embodiments, the housing 354 may be coupled to a base (not shown) to provide for structural support for the housing 354

As illustrated in FIG. 9c, the magnetic cylinder 300 may be a 3× brushless assembly in that the magnet assembly (e.g., the magnetic longitudinal cylinder 315, the first side magnetic ring 320, and the second side magnetic 330) acts as the rotor with the toroidal coil assembly 310 stationary. This configuration has the advantage of using coil segments whose conductor leads can be brought to a single location (not shown) allowing stepped speed control by simple switching series-parallel combinations in combination with varying voltage inputs where stepless control of motor/generator outputs are desired. A connecting hub 340 couples the magnetic cylinder 315 to the shaft 302 in a conventional manner.

FIG. 9d illustrates the magnetic cylinder 300 as a 3× concentrated brushed "side wall" brush assembly. This assembly may be easily incorporated into a modular assembly 500 illustrated in FIGS. 11a through 11d below. In certain embodiments, the modular assembly 500 may be a bolt up modular assembly which allows greater flexibility in selecting differing mechanical or electrical outputs without major design changes. Engineering needs and design consideration will determine the maximal numbers of magnetic cylinder and coils assemblies.

Figure 10A:
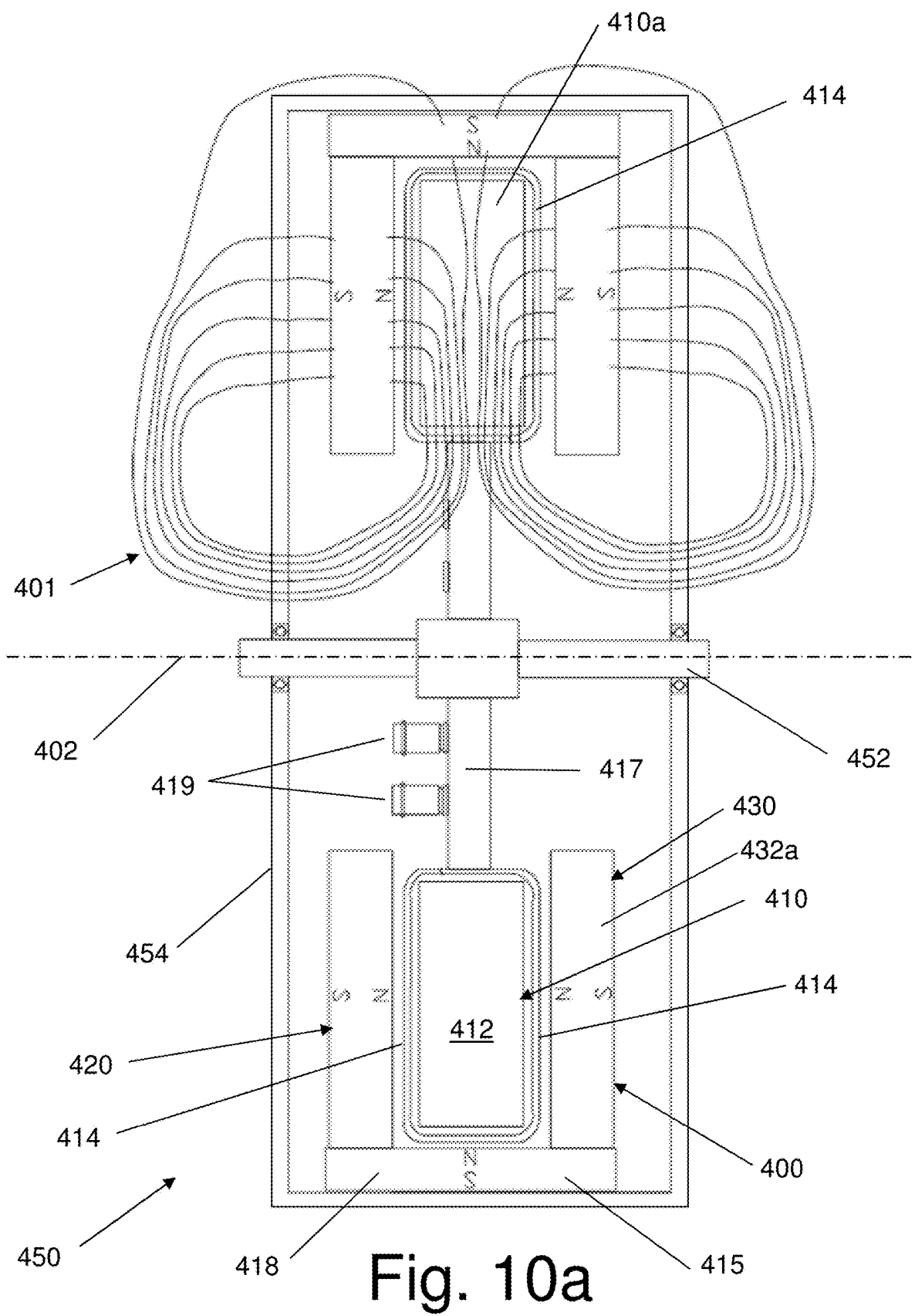
FIG. 10a is a section view of an alternative motor/generator assembly when a coil segment is not in an energized state.
Figure 10B:
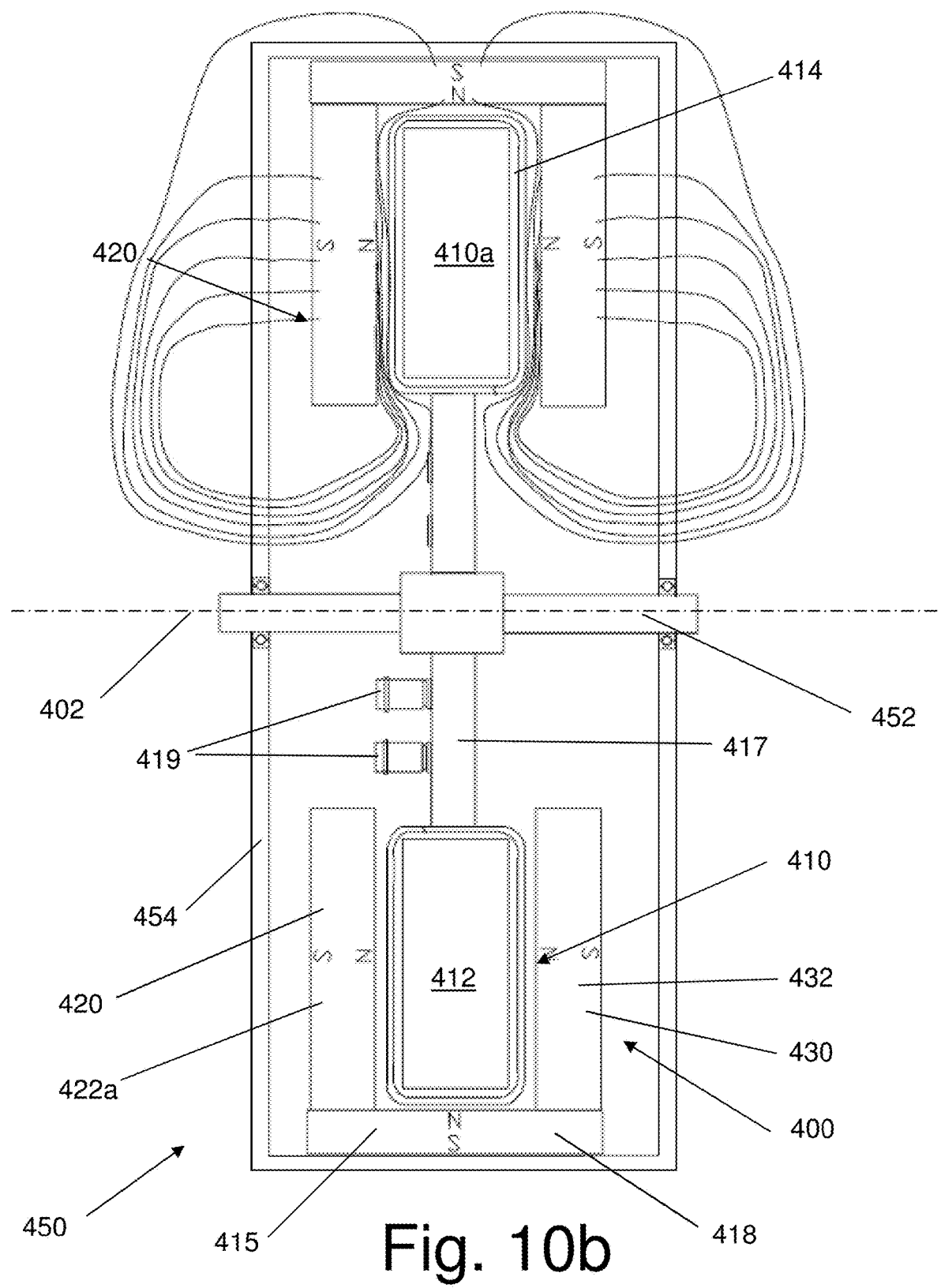
FIG. 10b is a section view of the motor/generator assembly of FIG. 10a when the coil segment is in an energized state.

Turning now to FIGS. 10a and 10b, there is presented an alternative embodiment or a 3× design which concentrates magnetic fields or flux lines 401 to improve the efficiency of a motor or generator 450. FIG. 10a is a longitudinal section view of the assembled magnetic cylindrical coil assembly 400 within the motor/generator assembly 450 where a coil segment 410a is not in an energized state. FIG. 10b is a longitudinal section view of the motor/generator assembly 450 when the coil segment 410a is in an energized state (i.e, current/voltage moving through the conductive material 414.

The enhanced flux toroidal core magnetic cylinder assembly 400 is similar to the core magnetic cylinder assembly 300 except that the interior parallel magnetic cylinder 315 is positioned on the outside of the side magnets ring assemblies 420 and 430.

In certain embodiments, a conductor wrapped coil assembly 410 comprises a core 412 which may be formed of iron, iron powder composite or other magnetic/non-magnetic core material similar to the core 312 discussed above. A conductive material 414, similar to the conductive material 314, is wrapped around the core 412 to form one or more coils or coil segments such as coil segment 410a. Thus, the coil assembly 410 may consist of one or more coil segments as described above in reference to the coil assembly 310.

The coil assembly 410 is generally ring shape which allows a connecting hub 417 to couple the coil assembly 410 to a longitudinal shaft 452. In certain embodiments, the connecting hub may be coupled to slip rings (not shown) or bushings 419.

As illustrated, the exterior magnetic cylinder 415 comprises a series or plurality of magnets 418 where the north poles face radially inward towards the core 412 and the longitudinal axis 402. A first side magnetic ring assembly 420 is positioned next to the coil assembly 410. In certain embodiments, the first side magnetic ring assembly 420 comprises a plurality of magnets 422 arranged in a radial pattern where the poles of each magnet 422a in the plurality of magnets are generally aligned in a parallel fashion with a longitudinal axis 402. As illustrated the north poles of the plurality of magnets 422 face inward toward the core 412.

In certain embodiments a second side magnetic ring assembly 430 comprises a plurality of magnets 432 arranged in a radial pattern where the poles of each magnet 432a in the plurality of magnets are generally aligned in a parallel fashion with the longitudinal axis 402. As illustrated the north poles of the plurality of magnets 432 face inward toward the core 412.

In the illustrative embodiment, the motor/generator assembly 450 has a longitudinal shaft 452. In certain embodiments, the longitudinal shaft 452 may be similar to the longitudinal shaft 352 discussed above.

In certain embodiments, there may be an outer casing or housing 454 (similar to housing 354 discussed above) which provides structural support for the coil assembly 410 and the longitudinal shaft 452. In some embodiments, external bearings (not shown) may be used to reduce the friction between the longitudinal shaft 452 and the housing 454 or a similar supporting structure.

As illustrated in FIGS. 10a and 10b, the magnetic cylinder 400 may be a 3× brushless assembly in that the magnet cylinder assembly 400 (e.g., the exterior magnetic ring 414, the first side magnetic ring 420, and the second side magnetic 430) acts as the stator with the toroidal coil assembly 410 acting as a rotor.

FIG. 10a illustrates the representative flux paths in a 3× magnetic cylinder assembly section prior to energization of the coils. When a current is established in the coil segment 410a, the permanent magnet flux lines 401 of FIG. 10a are forced outside the coil segment 410a and are compressed in the remaining space between the magnetic rings and the core or coil segment 410a as illustrated in FIG. 10b. A Lorentz force is then imparted on the rotor causing rotation in the case of a motor and induced current flow in the case of a generator. The force imparted or the voltage/current flow established is indicated by the Lorentz force calculations.

In a motor, force is equal to flux density in Tesla times the amperage times the conductor length in meters. In a generator voltage is equal to flux density in Tesla times velocity times times conductor length in meters. In all configurations presented in this application these basic calculations are utilized.

Figure 11A:
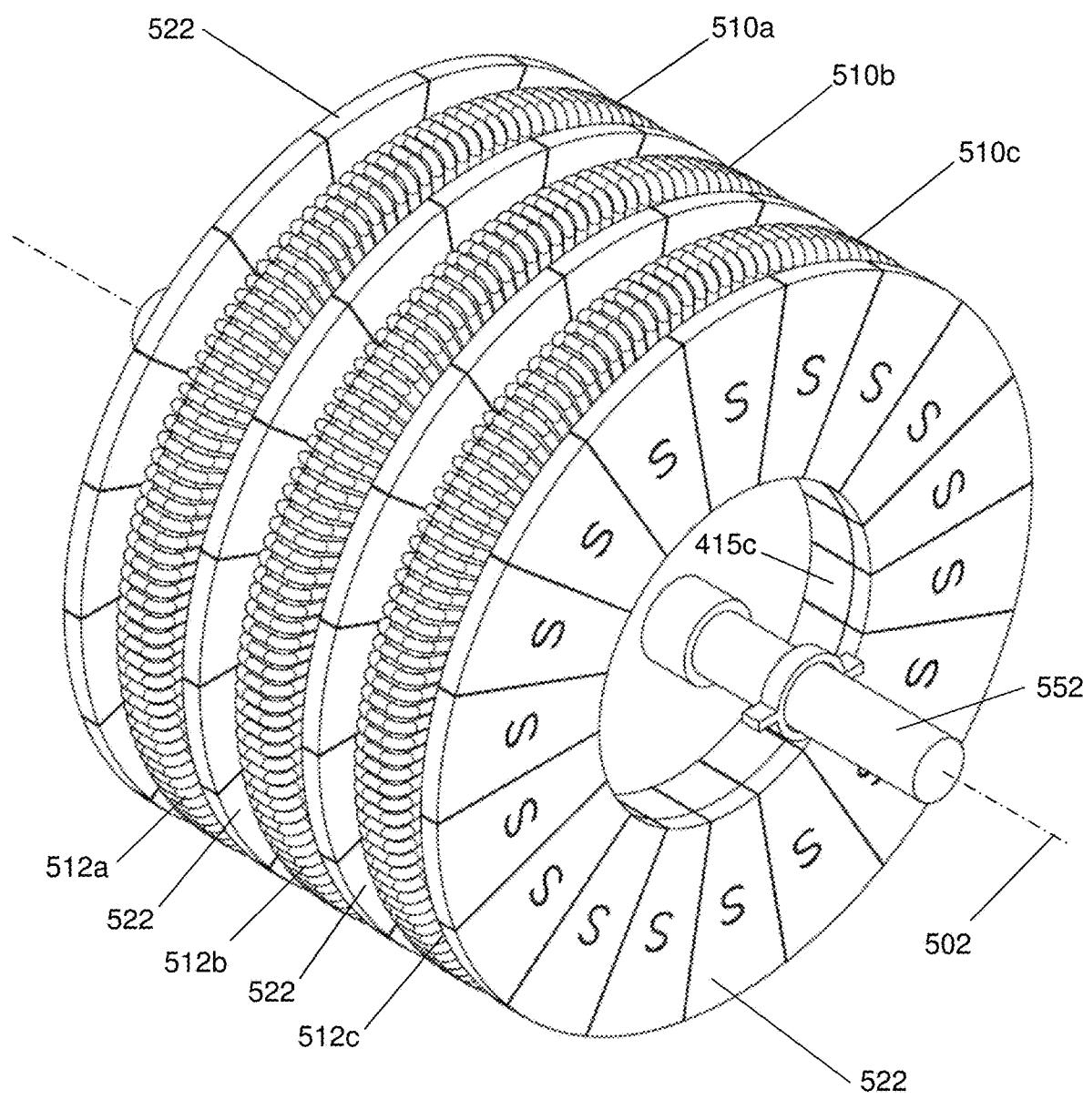
FIG. 11a is an isometric view of an alternative assembled magnetic cylindrical coil assembly.
Figure 11B:
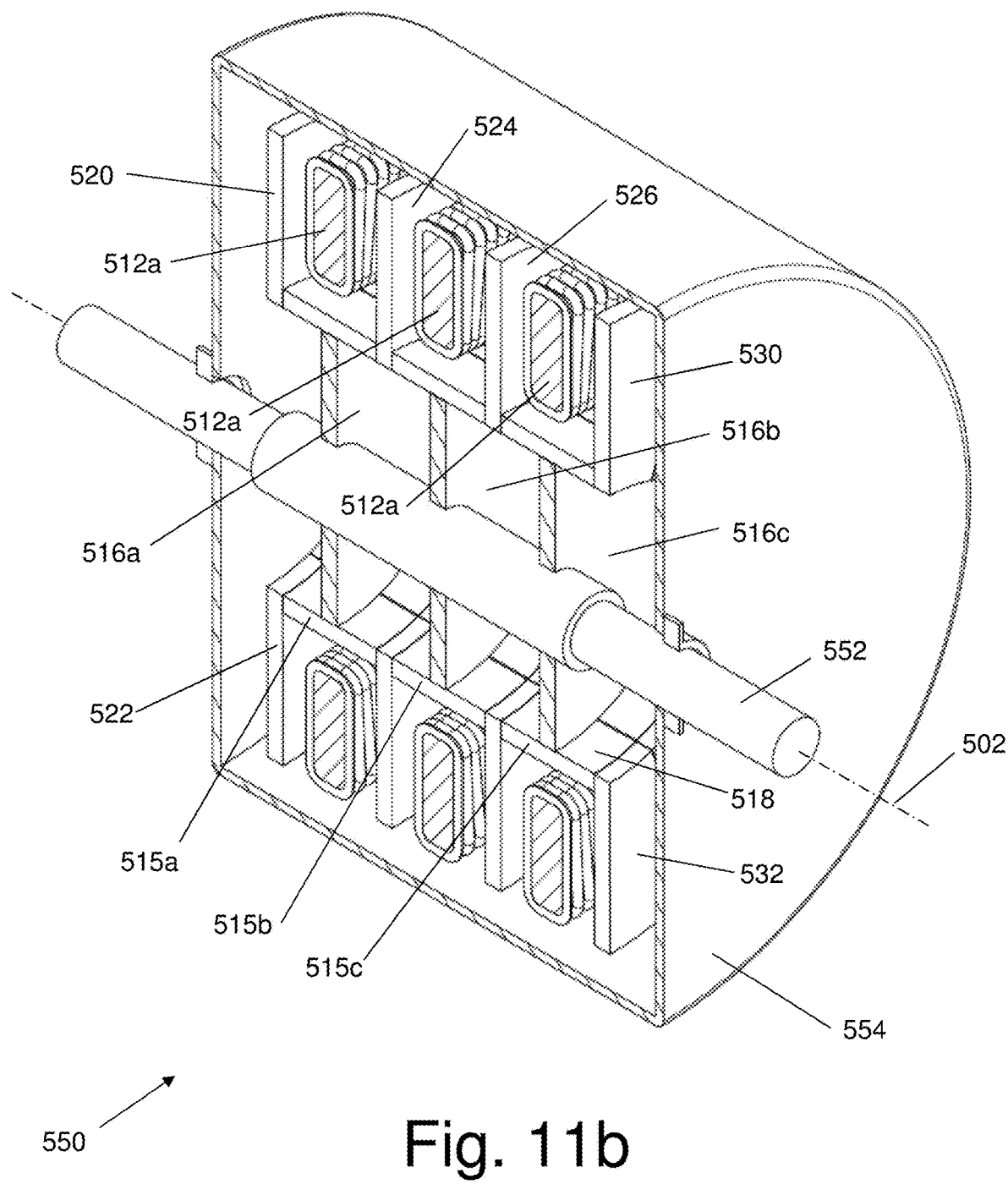
FIG. 11b is a longitudinal isometric section view of the assembled magnetic cylindrical coil assembly of FIG. 10a positioned within an alternative motor/generator assembly.
Figure 11C:
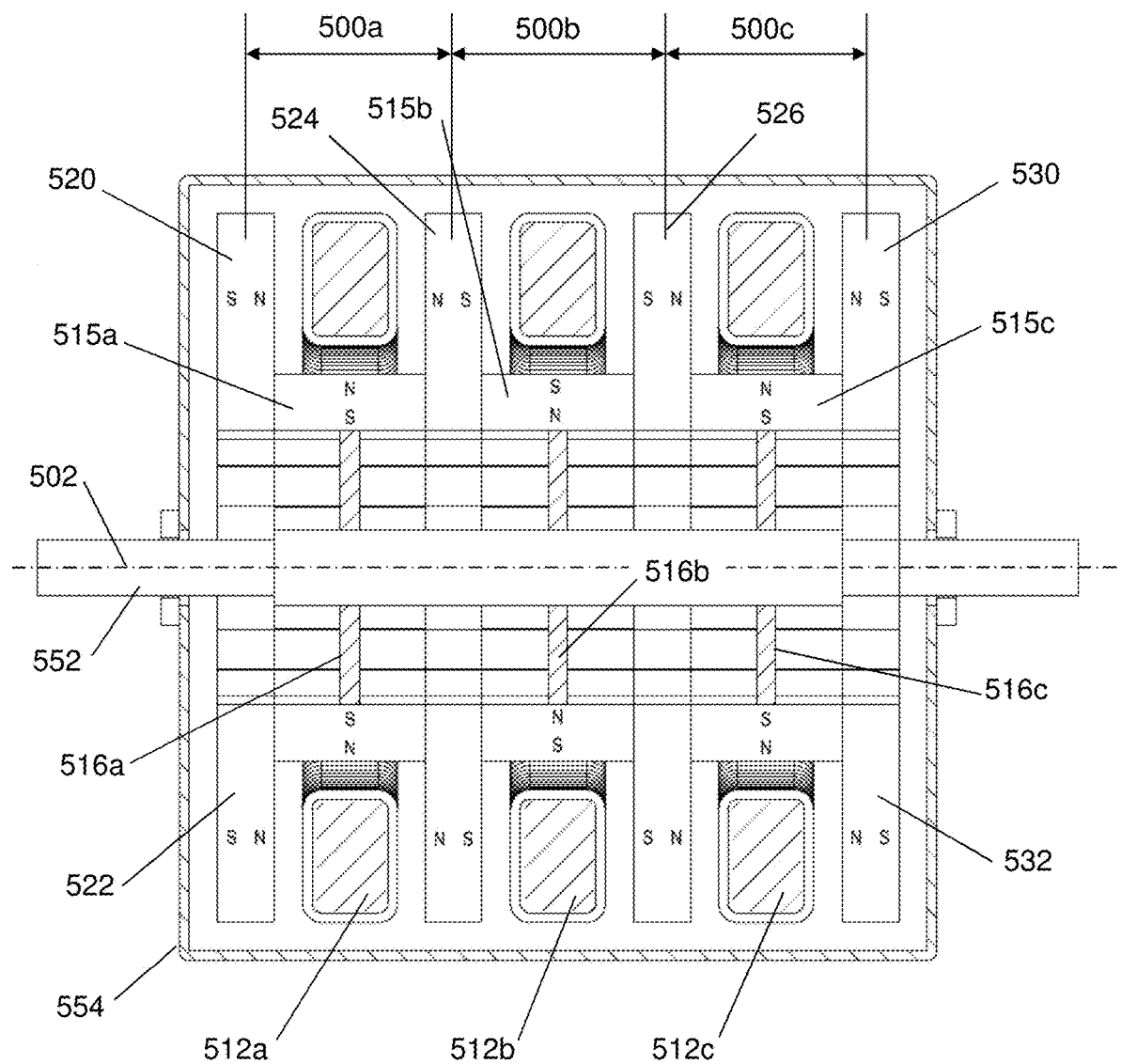
FIG. 11c is a longitudinal section view of the assembled magnetic cylindrical coil assembly of FIG. 10a within the motor/generator assembly of FIG. 10b.
Figure 11D:
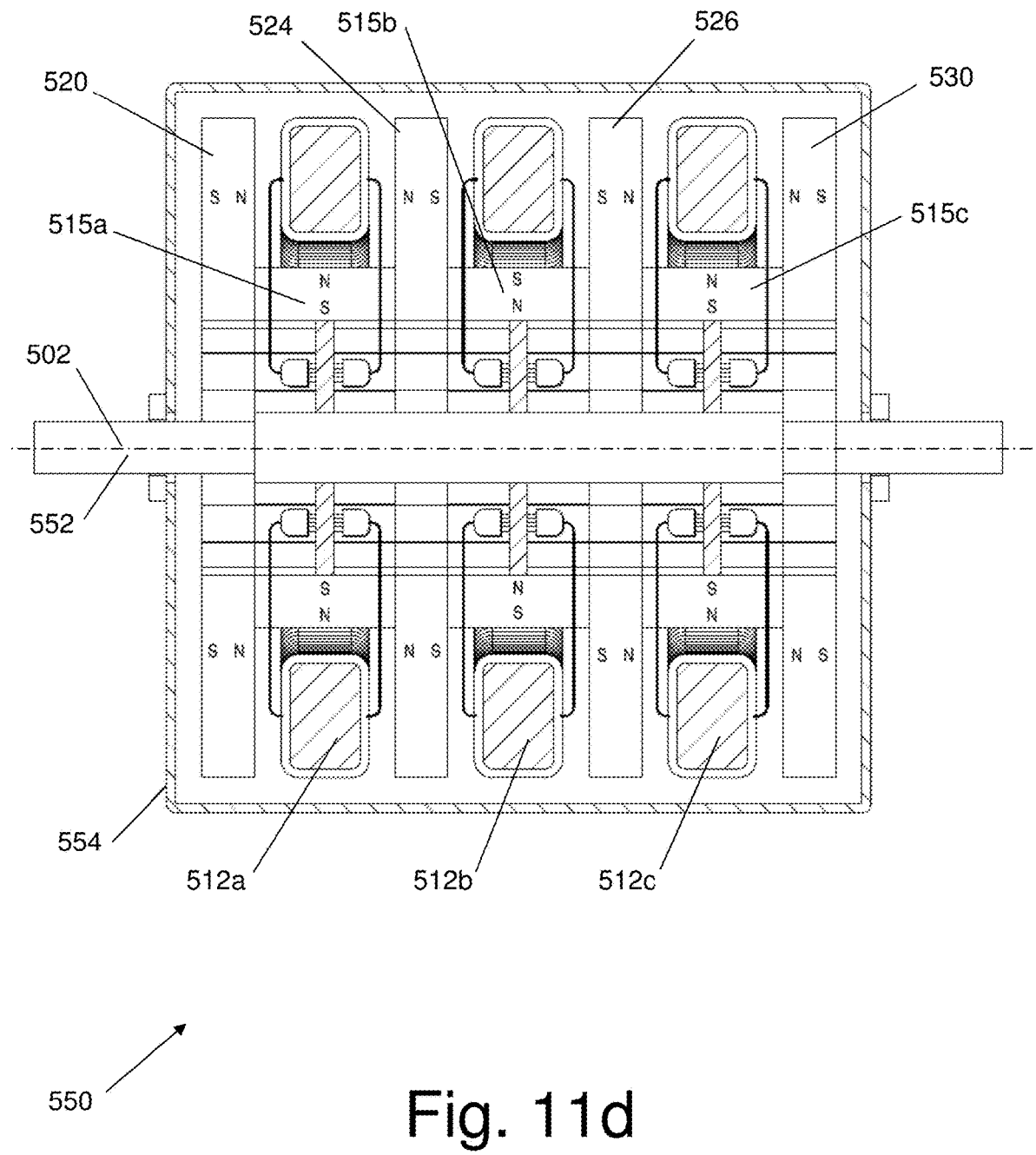
FIG. 11d is a longitudinal section view of the assembled magnetic cylindrical coil assembly of FIG. 10a within the motor/generator assembly of FIG. 10b showing a brush system electrically coupled to various coils of the magnetic cylindrical coil assembly.

Turning now to FIGS. 11a through 11d, there is presented an alternative modular embodiment where each module uses a 3× design which concentrates the magnetic field or flux lines to improve the efficiency of the motor or generator. FIG. 11a is an isometric view of the assembled magnetic cylindrical coil assembly 500. FIG. 11b is a longitudinal isometric section view of the assembled magnetic cylindrical coil assembly 500 within a motor/generator assembly 550. FIG. 11c is a longitudinal section view of the assembled magnetic cylindrical coil assembly 500 within a motor/generator assembly 550. FIG. 11d is a longitudinal section view of the assembled magnetic cylindrical coil assembly 500 within a motor/generator assembly 550 showing an exemplary brush system electrically coupled to various coils of the magnetic cylindrical coil assembly.

Turning now to FIGS. 11a and 11b, there is an enhanced flux toroidal core magnetic cylinder assembly 500. In some aspects, many of these components of the cylinder assembly 500 are assembled utilizing the enhanced magnetic cylinder concepts as described above. The magnetic assembly 500 is essentially three magnetic cylinders 100 (discussed above) assembled longitudinally as a single cylinder assembly (with certain polarities reversed as explained below) and on a common shaft.

In certain embodiments, conductor wrapped coil assemblies 510a through 510c include cores 512a through 512c similar to the core 312 discussed above. The cores 512a through 512c may be formed of iron, iron powder composite or other magnetic/non-magnetic core material. Conductive materials 514a through 514c, such as copper wire are individually wrapped around the cores 512a, the core 512b, and the core 512c to form one or more coil segments for each coil assembly 512a through 512c. As discussed above, multiple coil segments in each coil assembly 510a through 510c allows speed control by selectively connecting coil segments in differing combinations of series and parallel connections without changing the system supply voltage.

The coil assemblies 510a through 510c are generally ring shape which allows for interior magnetic cylinders 514a through 514c to be positioned annularly with respect to a longitudinal axis 502. A plurality of hubs, such as hub 516a through 516c couple a longitudinal shaft 552 to the interior magnetic cylinders 515a through 515c.

As illustrated, the interior magnetic cylinders 515a through 515c each comprise a series or plurality of magnets 518 positioned such that their magentic poles are radially aligned perpendicular to the longitudinal axis 502. A first end magnetic ring assembly 520 is positioned next to the coil assembly 510a. In certain embodiments, the first end magnetic ring assembly 520 comprises a plurality of magnets 522 arranged in a radial pattern where the poles of each magnet in the plurality of magnets are generally aligned in a parallel fashion with a longitudinal axis 502 (similar to the ring assembly 320 discussed above). As illustrated, the north poles of the plurality of magnets 522 face inward toward the core 512a.

In certain embodiments a second end magnetic ring assembly 530 comprises a plurality of magnets 532 arranged in a radial pattern where the poles of each magnet 532a in the plurality of magnets are generally aligned in a parallel fashion with the longitudinal axis 502. As illustrated, in FIGS. 11c and 11d, the north poles of the plurality of magnets 532 face inward toward the core 512c.

As illustrated in FIGS. 11c and 11d, the magnetic cylinder 500 may include three "magnetic cylinders" 500a, 500b, and 500c spaced longitudinally from each other and sharing the same shaft 552 and longitudinal axis 502. In the embodiment of the magnetic cylinder 500, the individual magnetic cylinders 500a, 500b, and 500c alternate magnetic polarities. For instance, the north pole of magnet 515a faces outward towards the core 512a. However, the north pole of the magnet 515b faces inward away from the core 512b. Similarly, the north pole of magnet 515c faces outward towards the core 512c. This pattern would continue if more individual magnetic cylinders were added to the magnetic cylinder assembly 500.

In other words, the space filled by the core 512a for the individual magnetic cylinder 500a has a magnetic force filled with a "north pole" polarity from the positioning of the magnets 522, the magnets 515a, and the magnets of the magnetic ring 524. On the other hand, the space filled by the core 512b for the individual magnetic cylinder 500b has a magnetic force filled with a "south pole" polarity from the positioning of the magnets of the magnetic ring 524, the magnets 515b, and the magnets of the magnetic ring 526. The space filled by the core 512c for the individual magnetic cylinder 500c has a magnetic force filled with a "north pole" polarity from the positioning of the magnets from the magnetic ring 526, the magnets 515c, and the magnets of the magnetic ring 532.

In certain embodiments, the longitudinal shaft 552 may be made from an iron, steel, or a ferrite compound with similar magnetic properties to iron. In certain embodiments, the longitudinal shaft 552 may include a ferrite compound or powder. In some embodiments, the ferrite compound or powder may be suspended in a viscous material, such as an insulating liquid, a lubricant, motor oil, gel, or mineral oil to reduce or eliminate eddy currents and magnetic hysteresis.

In certain embodiments, there may be an outer casing or housing 554 which provides structural support for the magnetic cylinder 500 and the longitudinal shaft 552. In certain embodiments, the housing 554 may be formed from any material, alloy, or compound having the required structural strength. In certain embodiments, non-ferrous materials may be used. In some embodiments, external bearings (not shown) may be used to reduce the friction between the longitudinal shaft 552 and the housing 554 or a similar supporting structure. In certain embodiments, the housing 554 may be coupled to a base (not shown) to provide for structural support for the housing 554.

In this example, the magnetic cylinders 500a through 500c include a 3× concentration and brushless assembly in that the magnet assembly (e.g., the magnetic ring or cylinder 515, the first side magnetic ring 520, and the second side magnetic 530) acts as the rotor with the toroidal coil assembly 510 stationary. This configuration has the advantage of using coil segments whose conductor leads can be brought to a single location (not shown) allowing stepped speed control by simple switching series-parallel combinations in combination with varying voltage inputs where stepless control of motor/generator outputs are desired.

Figure 12:
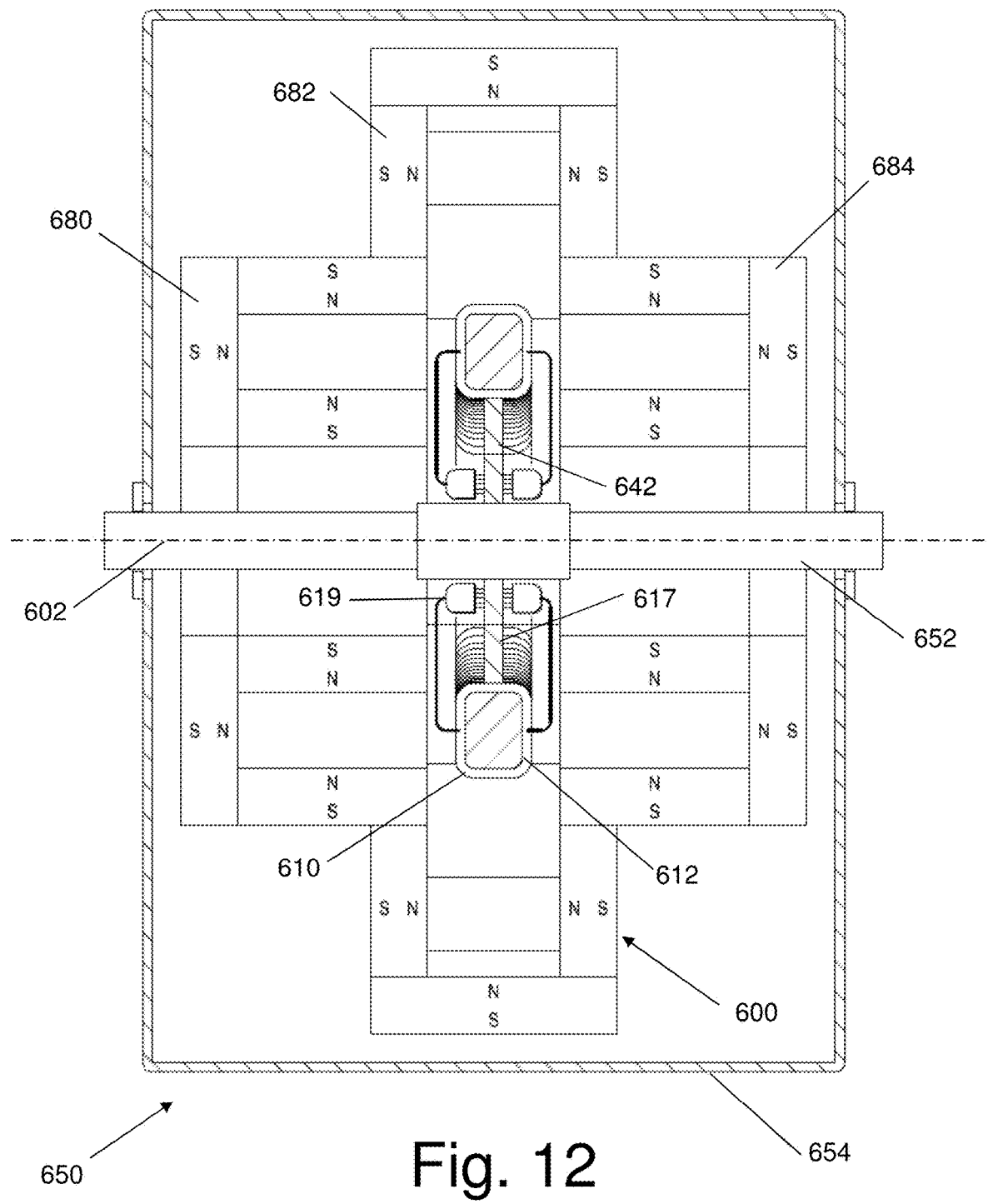
FIG. 12 is a longitudinal section view of an alternative magnetic cylindrical coil assembly positioned within a motor/generator assembly.

FIG. 12 is a longitudinal cross-sectional view of one embodiment of an electric motor/generator assembly 650 which incorporates an enhanced flux magnetic cylinder 600. The motor/generator assembly 650 may use components similar to the components discussed above, such as coil assembly 610. In some aspects, many of these components of the magnetic cylinder assembly 600 and the motor/generator assembly 650 are assembled utilizing the enhanced magnetic cylinder concepts as described above.

In certain embodiments, the conductor wrapped coil assembly 610 comprises a core 612 similar to the core 312 discussed above. A conductive material 614, such as copper wire is wrapped around the core 612 to form one or more coil segments 610a. The coil assembly 610 is generally ring shape and may be coupled to a connecting hub or sling ring assembly 617 which may in turn be coupled to a shaft 652.

As illustrated, the enhanced flux torodial magnetic cylinder assembly 600 comprises three U-shaped magnetic cylinders 680, 682 and 684 where the open end face of each U shaped cylinder faces the core 612 or the coil assembly 610. Each of the U-shaped magnetic cylinders are comprised with a series or plurality of magnets 618 where the north poles of each magnet faces inward towards the "U" space. Thus when assembled, the north poles of the plurality of magnets 618 faces the core 612 to concentrate the magnetic fields of the magnets.

The coil assembly 600 uses a 9× flux concentrator design (three 3× concentrators). Thus, the assembled 650 motor/ generator has a magnetic concentration of 9× and uses a typical DC brushes 619 (although four are shown, any number may be used depending on the engineering factors) to impart or collect the current. In this particular embodiment, the toroidal coil assembly 610 acts as the rotor which is connected to a slip ring assembly 642. The 9× magnet cylinder or ring assembly acts as the stator. The greater flux density acting on the conductors increases the Lorentz ouputs in motor or generator mode.

In the illustrative embodiment, the motor/generator assembly 650 has a longitudinal shaft 652, similar to the shaft 352 discussed above.

In certain embodiments, there may be an outer casing or housing 654 which provides structural support for the magnetic cylinder 600 and the longitudinal shaft 652.

Figure 13A:
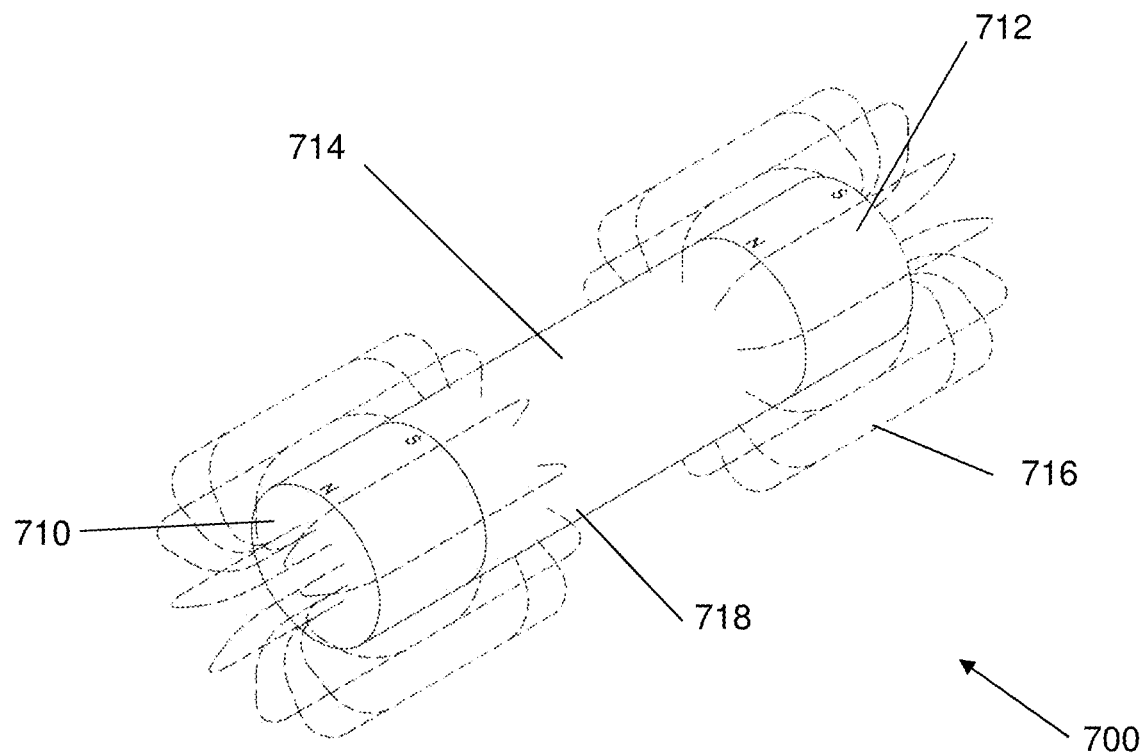
FIGS. 13a and 13b illustrate a hybrid electromagnet magnet assembly which may be used in place of conventional magnets in the various magnetic cylinders discussed within this disclosure.
Figure 13B:
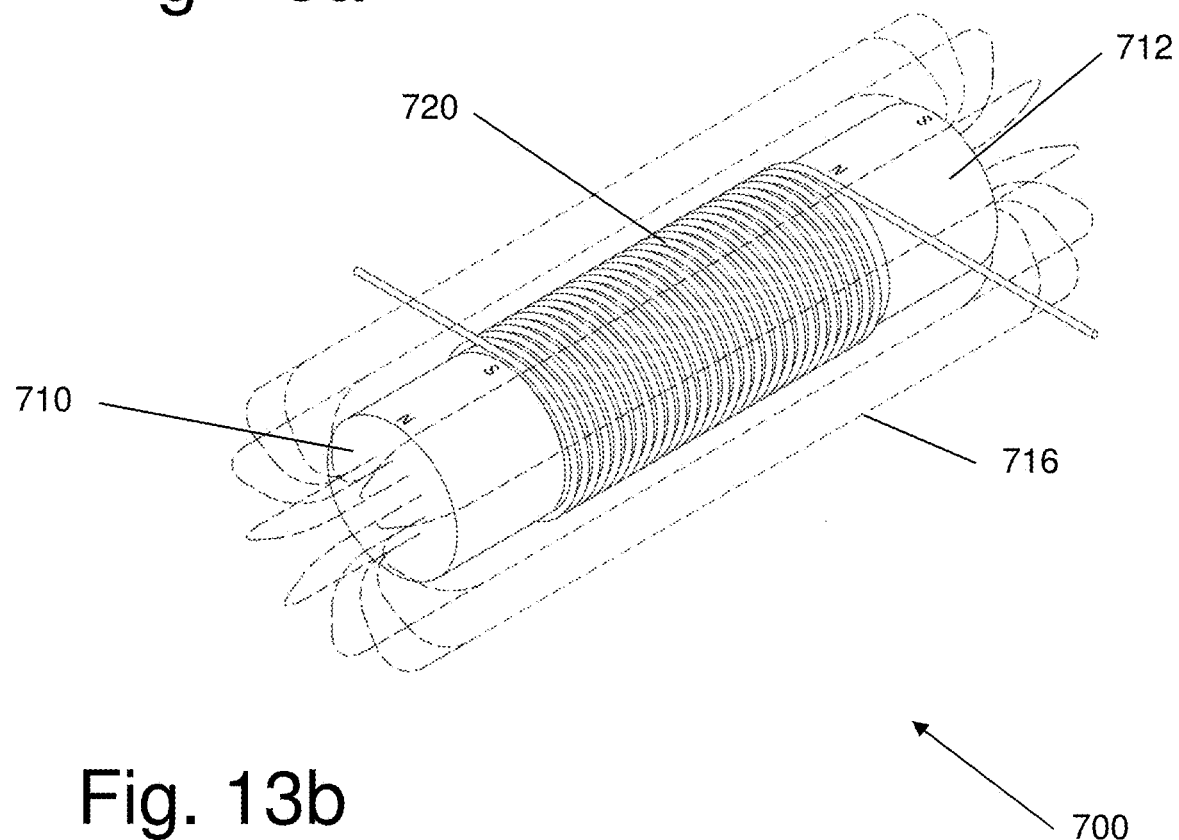

FIGS. 13a and 13b illustrate a hybrid electromagnet magnet assembly 700 which may be incorporated in certain aspects of the above magnetic cylinders to concentrate the magnetic fields. Additionally, iron cores or similar materials may also be used with the magnetic cylinders to concentrate the magnetic fields as described above.

In certain embodiments, the magnet assembly 700 comprises at least two or more commercially available permanent magnets 710 and 712 positioned on either end of an iron core 714. In the illustrated embodiment a cylinder shape has been selected but any shape may be constructed in any suitable configuration.

FIG. 13a illustrates conceptual flux lines 716 of the hybrid magnet assembly 700. One skilled in the art may see that though some of the aligned magnetic domains will contribute to flux lines 716 exiting the permanent magnets pole faces, however, most will "leak" out of the core side walls 718.

FIG. 13b illustrates the hybrid magnet assembly 700 with a spirally wrapped a conductive material 720 carrying a current. As illustrated, the conductor 720 confines and concentrates all the flux lines 716 to align any magnetic domains not aligned by the permanent magnets. This addition allows the creation of much stronger magnetic flux outputs at a lower ampere turn levels than conventional iron core coils.

Thus, such "hybrid" magnet assemblies can also be used to assist in the concentration of flux force lines in the magnetic cylinders discussed above.

In certain embodiments, there is an apparatus or system claims to produce voltage, for instance, there may be:

A system for generating DC electric voltage characterized by: a means for concentrating similarly polarized magnetic flux forces around a circumferential portion of a magnetic cylinder to create an area of magnetic concentration comprising a stacked plurality of similarly polarized magnetic flux forces, a means for coupling the coil segment to a longitudinal shaft such that as the longitudinal shaft rotates, the coil segment is moved into the area of concentration, a means for producing a voltage in the coil segment as the plurality of flux forces within the area of magnetic concentration are compressed, and a means for removing the voltage from the coil segment.

There may also be the above system further characterized by: a means for concentrating similarly polarized magnetic flux forces around an additional circumferential portion of the magnetic cylinder to create an additional area of magnetic concentration comprising an additional stacked plurality of similarly polarized magnetic flux forces wherein the additional area of magnetic concentration is radially positioned away from the area of magnetic concentration, a means for coupling the additional coil segment to a longitudinal shaft such that as the longitudinal shaft rotates, the additional coil segment is moved into the additional area of concentration, a means for producing an additional voltage in the additional coil segment as the plurality of flux forces within the area of magnetic concentration are compressed, and a means for removing the voltage from the coil segment.

There may also be the above systems wherein the system is further characterized by: a means for concentrating similarly polarized magnetic flux forces around a circumferential portion of an additional magnetic cylinder positioned longitudinally away from the magnetic cylinder to create an additional area of magnetic concentration within the additional magnetic cylinder comprising an additional stacked plurality of similarly polarized magnetic flux forces, a means for coupling an additional coil segment positioned within the additional cylinder to a longitudinal shaft such that as the longitudinal shaft rotates, the additional coil segment is moved into the additional area of concentration, a means for producing an additional current in the additional coil segment as the plurality of flux forces within the additional area of magnetic concentration are compressed, and a means for removing the additional voltage from the additional coil segment.

There may also be the above systems further characterized by: a means for concentrating similarly polarized magnetic flux forces around an additional circumferential portion of the additional magnetic cylinder to create an second additional area of magnetic concentration comprising a second additional stacked plurality of similarly polarized magnetic flux forces wherein the second additional area of magnetic concentration is radially positioned away from the additional area of magnetic concentration, a means for coupling a second additional coil segment positioned within the additional cylinder to the longitudinal shaft such that as the longitudinal shaft rotates, the second additional coil segment is moved into the second additional area of concentration, a means for producing a second additional voltage in the second additional coil segment as the plurality of flux forces within the second additional area of magnetic concentration are compressed, a means for removing the second additional voltage from the second additional coil segment.

Yet, there may also be a system or apparatus claims to produce mechanical power, for instance: A system for producing radial motion of a shaft, the system characterized by: a means for concentrating similarly polarized magnetic flux forces around a circumferential portion of a magnetic cylinder to create an area of magnetic concentration comprising a stacked plurality of similarly polarized magnetic flux forces, a means for radially moving a coil segment into the area of magnetic concentration, a means for applying a current to the coil segment to change the plurality of flux forces within the area of magnetic concentration, a means for creating a repulsive magnetic force on the coil segment to move the coil segment out of the area of magnetic concentration, and a means for coupling the coil segment to a longitudinal shaft such that as the coil segment moves out of the area of concentration, the shaft rotates in a radial manner.

There may also be the above system further characterized by: a means for concentrating similarly polarized magnetic flux forces around an additional circumferential portion of the magnetic cylinder to create an additional area of magnetic concentration comprising an additional stacked plurality of similarly polarized magnetic flux forces wherein the additional area of magnetic concentration is radially positioned away from the area of magnetic concentration, a means for radially moving an additional coil segment into the additional area of magnetic concentration, a means for applying an additional current to the additional coil segment to change the plurality of flux forces within the additional area of magnetic concentration, a means for creating an additional repulsive magnetic force on the additional coil segment to move the additional coil segment out of the additional area of concentration, and a means for coupling the additional coil segment to the longitudinal shaft such that as the additional coil segment moves out of the additional area of concentration, the additional coil segment contributes to the radial shaft rotation.

There may also be the above systems further characterized by: a means for concentrating similarly polarized magnetic flux forces around a circumferential portion of an additional magnetic cylinder positioned longitudinally away from the magnetic cylinder to create an additional area of magnetic concentration comprising an additional stacked plurality of similarly polarized magnetic flux forces, a means for radially moving an additional coil segment into the additional area of magnetic concentration, a means for applying an additional current to the additional coil segment to change the additional plurality of flux forces within the additional area of magnetic concentration, a means for creating an additional repulsive magnetic force on the additional coil segment to move the additional coil segment out of the additional area of magnetic concentration, and a means for coupling the additional coil segment to the longitudinal shaft such that as the additional coil segment moves out of the additional area of concentration, the additional coil segment contributes to the radial shaft rotation.

There may also be the above systems further characterized by: a means for concentrating similarly polarized magnetic flux forces around an additional circumferential portion of the additional magnetic cylinder to create an second additional area of magnetic concentration comprising a second additional stacked plurality of similarly polarized magnetic flux forces wherein the second additional area of magnetic concentration is radially positioned away from the additional area of magnetic concentration, a means for radially moving a second additional coil segment into the second additional area of magnetic concentration, a means for applying a second additional current to the second additional coil segment to change the plurality of flux forces within the second additional area of magnetic concentration, a means for creating a second additional repulsive magnetic force on the second additional coil segment to move the second additional coil segment out of the second additional area of concentration, and a means for coupling the second additional coil segment to the longitudinal shaft such that as the second additional coil segment moves out of the second additional area of concentration, the second additional coil segment contributes to the radial shaft rotation.

Also disclosed are means of creating the area of concentration, which may include: the above systems further characterized by: a means for positioning a longitudinal magnet within the magnetic cylinder, such that a longitudinal has a longitudinal axis that is parallel to a longitudinal axis of the shaft and that the poles of the longitudinal magnet are transverse to the longitudinal axis of the shaft, a means for positioning a first transverse magnet within the magnetic cylinder, such that the poles of the of the first transverse magnet are parallel to the longitudinal axis of the shaft, a means for positioning a second transverse magnet within the magnetic cylinder, such that the poles of the of the second transverse magnet are parallel to the longitudinal axis of the shaft, such that similarly polarized magnet poles all face towards one area to produce the area of magnetic concentration.

There may also be the above system further characterized by: a first magnet positioned within the magnetic cylinder, a second magnet positioned within the magnetic cylinder, such that similarly polarized magnet poles of the first and second magnets face towards one area to produce the area of magnetic concentration.

There may also be the above systems further characterized by: wherein the means for concentrating is further characterized by a third magnet positioned within the magnetic cylinder, such that similarly polarized magnet poles of the first magnet, second magnet, and third magnet face towards one area to produce the area of magnetic concentration.

There may also be the above systems further characterized by: wherein the means for concentrating is further characterized by positioning an additional magnets within the magnetic cylinder, such that similarly polarized magnetic poles of the first magnet, the second magnet, and the third magnet, and the additional magnets are positioned such that the polarized magnetic poles of the plurality of additional magnets face towards one area to produce the area of magnetic concentration.

There may also be the above systems further characterized by: wherein the means for concentrating is further characterized by an electromagnetic magnet positioned within the magnetic cylinder to produce the area of magnetic concentration.

There may also be the above systems further characterized by: a first magnet positioned within the magnetic cylinder, a second magnet positioned within the magnetic cylinder, an iron core coupling the first magnet to the second magnet and positioned between the first magnet and the second magnet, conductive material wrapped around the iron core, and a means for applying a current to the conductive material to produce an area of magnetic concentration.

Also disclosed are method claims to produce DC voltage: such as a method of producing DC voltage, the method characterized by: concentrating similarly polarized magnetic flux forces around a circumferential portion of a magnetic cylinder to create an area of magnetic concentration comprising a stacked plurality of similarly polarized magnetic flux forces, coupling the coil segment to a longitudinal shaft such that as the longitudinal shaft rotates, the coil segment is moved into the area of concentration, producing a voltage in the coil segment as the plurality of flux forces within the area of magnetic concentration are compressed, removing the voltage from the coil segment.

The methods of the above claims further characterized by: concentrating similarly polarized magnetic flux forces around an additional circumferential portion of the magnetic cylinder to create an additional area of magnetic concentration comprising an additional stacked plurality of similarly polarized magnetic flux forces wherein the additional area of magnetic concentration is radially positioned away from the area of magnetic concentration, coupling the additional coil segment to a longitudinal shaft such that as the longitudinal shaft rotates, the additional coil segment is moved into the additional area of concentration, producing an additional voltage in the additional coil segment as the plurality of flux forces within the area of magnetic concentration are compressed, removing the voltage from the coil segment.

The methods of the above claims wherein the method is further characterized by: concentrating similarly polarized magnetic flux forces around a circumferential portion of an additional magnetic cylinder positioned longitudinally away from the magnetic cylinder to create an additional area of magnetic concentration within the additional magnetic cylinder comprising an additional stacked plurality of similarly polarized magnetic flux forces, coupling an additional coil segment positioned within the additional cylinder to a longitudinal shaft such that as the longitudinal shaft rotates, the additional coil segment is moved into the additional area of concentration, producing an additional voltage in the additional coil segment as the plurality of flux forces within the additional area of magnetic concentration are compressed, removing the additional voltage from the additional coil segment.

The methods of the above claims further characterized by: concentrating similarly polarized magnetic flux forces around an additional circumferential portion of the additional magnetic cylinder to create an second additional area of magnetic concentration comprising a second additional stacked plurality of similarly polarized magnetic flux forces wherein the second additional area of magnetic concentration is radially positioned away from the additional area of magnetic concentration, coupling a second additional coil segment positioned within the additional cylinder to the longitudinal shaft such that as the longitudinal shaft rotates, the second additional coil segment is moved into the second additional area of concentration, producing a second additional voltage in the second additional coil segment as the plurality of flux forces within the second additional area of magnetic concentration are compressed, removing the second additional voltage from the second additional coil segment.

Additionally, there may be methods to produce DC mechanical power such as: a method of producing a radial motion of a shaft, the method characterized by: concentrating similarly polarized magnetic flux forces around a circumferential portion of a magnetic cylinder to create an area of magnetic concentration comprising a stacked plurality of similarly polarized magnetic flux forces, radially moving a coil segment into the area of magnetic concentration, applying a current to the coil segment to change the plurality of flux forces within the area of magnetic concentration, creating a repulsive magnetic force on the coil segment to move the coil segment out of the area of magnetic concentration, and coupling the coil segment to a longitudinal shaft such that as the coil segment moves out of the area of concentration, the shaft rotates in a radial manner.

The methods of the above claims further characterized by: concentrating similarly polarized magnetic flux forces around an additional circumferential portion of the magnetic cylinder to create an additional area of magnetic concentration comprising an additional stacked plurality of similarly polarized magnetic flux forces wherein the additional area of magnetic concentration is radially positioned away from the area of magnetic concentration, radially moving an additional coil segment into the additional area of magnetic concentration, applying an additional current to the additional coil segment to change the plurality of flux forces within the additional area of magnetic concentration, creating an additional repulsive magnetic force on the additional coil segment to move the additional coil segment out of the additional area of concentration, and coupling the additional coil segment to the longitudinal shaft such that as the additional coil segment moves out of the additional area of concentration, the additional coil segment contributes to the radial shaft rotation.

The methods of the above claims further characterized by: concentrating similarly polarized magnetic flux forces around a circumferential portion of an additional magnetic cylinder positioned longitudinally away from the magnetic cylinder to create an additional area of magnetic concentration comprising an additional stacked plurality of similarly polarized magnetic flux forces, radially moving an additional coil segment into the additional area of magnetic concentration, applying an additional current to the additional coil segment to change the additional plurality of flux forces within the additional area of magnetic concentration, creating an additional repulsive magnetic force on the additional coil segment to move the additional coil segment out of the additional area of magnetic concentration, and coupling the additional coil segment to the longitudinal shaft such that as the additional coil segment moves out of the additional area of concentration, the additional coil segment contributes to the radial shaft rotation.

The methods of the above claims further characterized by: concentrating similarly polarized magnetic flux forces around an additional circumferential portion of the additional magnetic cylinder to create an second additional area of magnetic concentration comprising a second additional stacked plurality of similarly polarized magnetic flux forces wherein the second additional area of magnetic concentration is radially positioned away from the additional area of magnetic concentration, radially moving a second additional coil segment into the second additional area of magnetic concentration, applying a second additional current to the second additional coil segment to change the plurality of flux forces within the second additional area of magnetic concentration, creating a second additional repulsive magnetic force on the second additional coil segment to move the second additional coil segment out of the second additional area of concentration, and coupling the second additional coil segment to the longitudinal shaft such that as the second additional coil segment moves out of the second additional area of concentration, the second additional coil segment contributes to the radial shaft rotation.

As above, there may also be methods of creating the area of concentration: such as the methods of the above claims wherein the concentrating is further characterized by: positioning a longitudinal magnet within the magnetic cylinder, such that a longitudinal has a longitudinal axis that is parallel to a longitudinal axis of the shaft and that the poles of the longitudinal magnet are transverse to the longitudinal axis of the shaft, positioning a first transverse magnet within the magnetic cylinder, such that the poles of the of the first transverse magnet are parallel to the longitudinal axis of the shaft, positioning a second transverse magnet within the magnetic cylinder, such that the poles of the of the second transverse magnet are parallel to the longitudinal axis of the shaft, such that similarly polarized magnet poles all face towards one area to produce the area of magnetic concentration.

The methods of the above claims wherein the concentrating is further characterized by: positioning a first magnet within the magnetic cylinder, positioning a second magnet within the magnetic cylinder, such that similarly polarized magnet poles of the first and second magnets face towards one area to produce the area of magnetic concentration.

The methods of the above claims wherein the concentrating is further characterized by positioning a third magnet within the magnetic cylinder, such that similarly polarized magnet poles of the first magnet, second magnet, and third magnet face towards one area to produce the area of magnetic concentration.

The methods of the above claims wherein the concentrating is further characterized by positioning a fourth magnet within the magnetic cylinder, such that similarly polarized magnet poles of the first magnet, second magnet, third magnet and forth magnet face towards one area to produce the area of magnetic concentration.

The methods of the above claims further characterized by wherein the concentrating is further characterized by positioning a fifth magnet within the magnetic cylinder, such that similarly polarized magnet poles of the first magnet, second magnet, third magnet, forth magnet and firth magnets face towards one area to produce the area of magnetic concentration.

The methods of the above claims further characterized by wherein the concentrating is further characterized by positioning an additional magnets within the magnetic cylinder, such that similarly polarized magnetic poles of the first magnet and the polarized magnetic poles of the plurality of additional magnets face towards one area to produce the area of magnetic concentration.

The methods of the above claims wherein the concentrating is further characterized by positioning an electromagnetic magnet within the magnetic cylinder to produce the area of magnetic concentration.

The methods of the above claims wherein the concentrating is further characterized by: positioning a first magnet within the magnetic cylinder, positioning a second magnet within the magnetic cylinder, positioning an iron core between the first magnet and the second magnet, positioning conductive material around the iron core, and applying a current to the conductive material to produce an area of magnetic concentration.

The methods of the above claims wherein the concentrating is further characterized by positioning one or more iron cores or similar metals within the magnetic cylinder to assist in producing the area of magnetic concentration.

The abstract of the disclosure is provided for the sole reason of complying with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

Any advantages and benefits described may not apply to all embodiments of the invention. When the word "means" is recited in a claim element, Applicant intends for the claim element to fall under 35 USC 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC 112, paragraph 6.

The foregoing description of the embodiments of the invention has been presented for the purposes of illustration and description. It is not intended to be exhaustive or to limit the invention to the precise form disclosed. Many combinations, modifications and variations are possible in light of the above teaching. Undescribed embodiments which have interchanged components are still within the scope of the present invention. It is intended that the scope of the invention be limited not by this detailed description, but rather by the claims appended hereto.

What is claimed is:

1. A system of producing DC voltage, the system comprising:
    a partial toroidal magnetic cylinder positioned about a longitudinal axis;
    a first means for concentrating similarly polarized magnetic flux forces within an interior of the partial toroidal magnetic cylinder to create a first area of magnetic concentration, where the first means for concentrating comprises:
    a first means of providing a plurality of similarly polarized magnetic flux forces directed at the interior and having a first length that is parallel to the longitudinal axis,
    a second means of providing a plurality of similarly polarized magnetic flux forces directed at the interior and facing the first means and having a second length that is parallel to the longitudinal axis,
    a third means of providing a plurality of similarly polarized magnetic flux forces directed at the interior and having a third length that is transverse to the longitudinal axis,
    a fourth means of providing a plurality of similarly polarized magnetic flux forces directed at the interior and facing the third means,
    wherein the first length is greater than the third length;
    a 360 degree rotation path comprising at least the interior of the toroidal magnetic cylinder and an area outside of the interior of the toroidal magnetic cylinder;
    a first coil segment;
    a means for rotating the first coil segment through the interior of the interior of the partial toroidal magnetic cylinder; and
    a means for removing the voltage from the first coil segment as the first coil segment rotationally moves through the first area of magnetic concentration.

2. The system of claim 1 further comprising a second coil segment and a means for removing the voltage from the second coil segment as the second coil segment rotationally moves through the first area of magnetic concentration.

3. The system of claim 2 further comprising an additional coil segment and a means for removing the voltage from the additional coil segment as the additional coil segment moves rotationally through the first area of magnetic concentration.

4. The system of claim 1, wherein the first means of providing a plurality of similarly polarized magnetic flux forces directed at the interior further comprises: a first magnet means positioned along an interior wall of the partial toroidal magnetic cylinder having at least one magnet with a first common pole facing towards the interior of the partial toroidal magnetic cylinder.

5. The system of claim 4, wherein the second means of providing a plurality of similarly polarized magnetic flux forces directed at the interior further comprises: a second magnet means positioned along an interior wall of the partial toroidal magnetic cylinder having at least one magnet with a second common pole facing towards the interior of the partial toroidal magnetic cylinder, wherein the first common pole and the second common pole have the same magnetic polarity.

6. The system of claim 5, wherein the third means of providing a plurality of similarly polarized magnetic flux forces directed at the interior further comprises: a third magnet means positioned along an interior wall of the partial toroidal magnetic cylinder having at least one magnet with a third common pole facing towards the interior of the partial toroidal magnetic cylinder, wherein the first common pole, the second common pole, and the third common pole have the same magnetic polarity.

7. The system of claim 6, wherein the fourth means of providing a plurality of similarly polarized magnetic flux forces directed at the interior further comprises: a fourth magnet means positioned along an interior wall of the partial toroidal magnetic cylinder having at least one magnet with a fourth common pole facing towards the interior of the partial toroidal magnetic cylinder, wherein the first common pole, the second common pole, the third common pole, and the fourth common pole have the same magnetic polarity.

8. The system of claim 7, wherein the first means for concentrating further comprises a means for creating a flux line from at least one magnet of the first, second, third, or forth plurality of magnets such that the flux line flows from the north pole of the magnet in a perpendicular manner from an interior face of the magnet, through the interior cavity of the toroidal magnetic cylinder, out an open end of the toroidal magnetic cylinder, into the open area, and then around an exterior of the toroidal cylinder to the exterior face of the magnet containing its south pole.

9. The system of claim 1, wherein the 360 degree rotation path further comprises means for producing a magnetic field of a differing magnetic polarity in the area outside of the interior of the toroidal magnetic cylinder.

10. The system of claim 1, wherein the 360 degree rotation path further comprises a circular core upon which one or more coil segments may be positioned around a portion of the circular core.

11. A motor comprising:
   a partial toroidal magnetic cylinder positioned about a longitudinal axis,
   a first means for concentrating similarly polarized magnetic flux forces within the interior of a partial toroidal magnetic cylinder to create a first area of magnetic concentration comprising a plurality of similarly polarized magnetic flux forces, where the first means for concentrating comprises:
   a first means of providing a plurality of similarly polarized magnetic flux forces directed at the interior and having a first length that is parallel to the longitudinal axis,
   a second means of providing a plurality of similarly polarized magnetic flux forces directed at the interior and facing the first means and having a second length that is parallel to the longitudinal axis,
   a third means of providing a plurality of similarly polarized magnetic flux forces directed at the interior and having a third length that is transverse to the longitudinal axis,
   a fourth means of providing a plurality of similarly polarized magnetic flux forces directed at the interior and facing the third means,
   wherein the first length is greater than the third length;
   a 360 degree rotation path comprising at least the interior of the toroidal magnetic cylinder and an open area outside of the interior of the toroidal magnetic cylinder,
   a first coil segment;
   a means for applying a current to the first coil segment; and
   a means for coupling the first coil segment to a shaft.

12. The motor of claim 11, further comprising a second coil segment and a means for applying a current to the second coil segment.

13. The motor of claim 12, further comprising further comprising an additional coil segment and a means for applying a current to the additional coil segment.

14. The motor of claim 11, wherein the 360 degree rotation path comprising the interior of the toroidal magnetic cylinder and an area outside of the interior of the toroidal magnetic cylinder further comprises an area of magnetic concentration which is of an opposite magnetic polarity to the first area of magnetic concentration.

15. The motor of claim 11, wherein the 360 degree rotation path further comprises providing a circular core upon which one or more coil segments may be positioned around a portion of the circular core.

* * * * *